United States Patent
Jeong et al.

(10) Patent No.: US 12,315,088 B2
(45) Date of Patent: May 27, 2025

(54) AUGMENTED REALITY DEVICE FOR OBTAINING POSITION INFORMATION OF JOINTS OF USER'S HAND AND OPERATING METHOD THEREOF

(71) Applicant: SAMSUNG ELECTRONICS CO., LTD., Suwon-si (KR)

(72) Inventors: Jiwon Jeong, Suwon-si (KR); Taehyuk Kwon, Suwon-si (KR); Deokho Kim, Suwon-si (KR); Hwangpil Park, Suwon-si (KR); Gunill Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/018,814

(22) PCT Filed: Dec. 20, 2022

(86) PCT No.: PCT/KR2022/020874
§ 371 (c)(1),
(2) Date: Jan. 30, 2023

(87) PCT Pub. No.: WO2023/128446
PCT Pub. Date: Jul. 6, 2023

(65) Prior Publication Data
US 2024/0265641 A1     Aug. 8, 2024

(30) Foreign Application Priority Data

Dec. 28, 2021   (KR) .................. 10-2021-0190393

(51) Int. Cl.
*G06T 19/00*   (2011.01)
*G06F 3/01*   (2006.01)
(Continued)

(52) U.S. Cl.
CPC ............ *G06T 19/006* (2013.01); *G06F 3/014* (2013.01); *G06F 3/0346* (2013.01); *G06V 40/28* (2022.01); *G06V 2201/07* (2022.01)

(58) Field of Classification Search
None
See application file for complete search history.

(56) References Cited

U.S. PATENT DOCUMENTS

| | | |
|---|---|---|
| 10,078,377 B2 | 9/2018 | Balan et al. |
| 10,304,248 B2 | 5/2019 | Woo et al. |

(Continued)

FOREIGN PATENT DOCUMENTS

| | | |
|---|---|---|
| JP | 2015-60518 A | 3/2015 |
| JP | 6971788 B2 | 11/2021 |
| WO | 2020/182309 A1 | 9/2020 |

OTHER PUBLICATIONS

Yongjun Lee et al, "Wearable Finger Tracking and Cutaneous Haptic Interface with Soft Sensors for Multi-Fingered Virtual Manipulation", IEEE/ASME Transactions on Mechatronics, vol. 24, No. 1, pp. 67-77, Feb. 2019.

(Continued)

*Primary Examiner* — Robert J Craddock
(74) *Attorney, Agent, or Firm* — Sughrue Mion, PLLC

(57) ABSTRACT

Provided are an augmented reality (AR) device for improving the accuracy of position information of a joint of a hand obtained through vision-based hand tracking technology by using a sensor measurement value obtained from an external device, and an operating method thereof. According to an embodiment of the disclosure, the AR device may update a three-dimensional position coordinate value of a joint of a hand by correcting a three-dimensional position coordinate value of the joint of the hand obtained from a plurality of image frames obtained through a camera by using a mea- (Continued)

surement value of an inertial measurement unit (IMU) sensor obtained from a wearable device.

15 Claims, 19 Drawing Sheets

(51) Int. Cl.
*G06F 3/0346* (2013.01)
*G06V 40/20* (2022.01)

(56) References Cited

U.S. PATENT DOCUMENTS

| | | |
|---|---|---|
| 10,386,938 B2 | 8/2019 | Raja et al. |
| 10,798,292 B1 | 10/2020 | Lei et al. |
| 10,824,237 B2 | 11/2020 | Murakami |
| 10,891,473 B2 | 1/2021 | Zhang et al. |
| 10,963,041 B2 | 3/2021 | Wetzler et al. |
| 2012/0327125 A1 | 12/2012 | Kutliroff et al. |
| 2014/0098018 A1 | 4/2014 | Kim et al. |
| 2016/0313798 A1* | 10/2016 | Connor ................ G06F 3/017 |
| 2017/0140552 A1 | 5/2017 | Woo et al. |

OTHER PUBLICATIONS

International Search Report (PCT/ISA/210) and Written Opinion (PCT/ISA/237) issued by the International Searching Authority on Mar. 30, 2023 in corresponding International Application No. PCT/KR2022/020874.

* cited by examiner

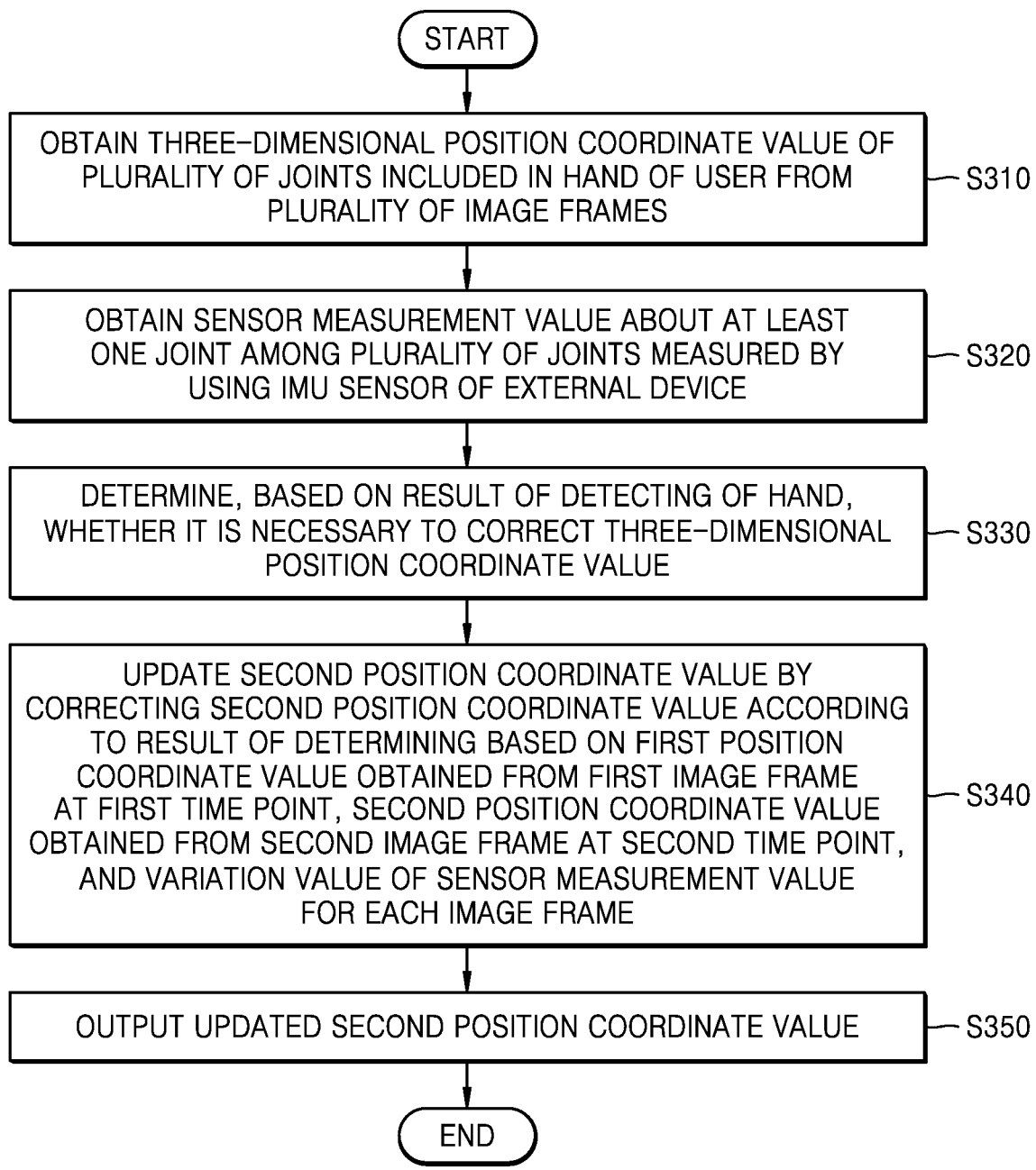

AUGMENTED REALITY DEVICE FOR OBTAINING POSITION INFORMATION OF JOINTS OF USER'S HAND AND OPERATING METHOD THEREOF

CROSS-REFERENCE TO RELATED APPLICATIONS

This application is a 371 National Stage of International Application No. PCT/KR2022/020874 filed on Dec. 20, 2022, in the Korean Intellectual Property Receiving Office, which is based on and claims priority to Korean Application No. 10-2021-0190393 filed on Dec. 28, 2021, filed in the Korean Intellectual Property Office, the disclosures of which are incorporated herein by reference in their entireties.

TECHNICAL FIELD

The disclosure relates to an augmented reality (AR) device for obtaining position information of a joint included in a hand of a user, and an operating method of the AR device. In particular, the disclosure relates to an AR device for obtaining three-dimensional position coordinate values of a plurality of joints included in a hand of a user from a plurality of image frames obtained through a camera, to track the position of joints in real time, and an operating method of the AR device.

BACKGROUND ART

Augmented reality (AR) is a technology for overlaying and displaying a virtual image on a real-world object or a physical environment space of the real world, and AR devices (e.g., smart glasses) using AR technology are usefully used in everyday life such as information retrieval, navigation, or camera shooting. In particular, smart glasses are also worn as fashion items and are mainly used for outdoor activities.

Because an AR device is incapable of performing touch operations due to its characteristics, a hand interaction using the three-dimensional pose and gesture of a user's hand as an input means is important as an input interface in order to provide an AR service. Thus, a technology for obtaining three-dimensional position information of a plurality of joints included in the hand, accurately tracking the pose (shape) of the hand through the three-dimensional position information, and detecting the gesture thereof is required for implementation of more realistic AR technology.

In order to ensure the freedom of both hands of the user, a general AR device does not use a separate external input device but uses a vision-based hand tracking technology for detecting the user's hand from an image obtained by using a camera mounted on the AR device. The AR device uses a stereo camera or a depth camera to obtain a three-dimensional position coordinate value of a joint of the hand. However, when a camera is used to obtain a three-dimensional position coordinate value of a joint of the hand, because hand detection is possible only in a field of view (FOV) area of the camera, the accuracy of the three-dimensional position coordinate value of the joint may be lowered when the hand is not detected or is not correctly detected. When the accuracy of the three-dimensional position coordinate value of the joint of the hand is low, the pose or gesture of the hand may not be detected or may not be correctly detected and accordingly, the user satisfaction and the stability of the AR service may decrease.

Thus, there is increasing demand for an AR device that improves the accuracy of the joint position information and the hand detection accuracy of the vision-based hand tracking technology and provides a stable AR service.

DISCLOSURE

Technical Solution

The disclosure provides an augmented reality (AR) device for obtaining position information about a plurality of joints included in a hand of a user. According to an aspect of the disclosure, the AR device includes a communication interface configured to perform data communication with an external device, a camera configured to obtain a plurality of image frames including the hand by photographing the hand, a memory storing at least one instruction, and at least one processor configured to execute the at least one instruction to detect the hand from the plurality of image frames and obtain three-dimensional position coordinate values of a plurality of joints included in the detected hand, obtain, through the communication interface, a sensor measurement value for at least one joint among the plurality of joints measured by an inertial measurement unit (IMU) sensor of the external device, determine, based on a result of the detecting of the hand, whether it is necessary to correct a three-dimensional position coordinate value of at least one joint obtained from a first image frame among the plurality of image frames, and update a second position coordinate value by correcting the second position coordinate value according to a result of the determining based on at least one of a first position coordinate value of the plurality of joints obtained from a second image frame previous to a first image frame among the plurality of image frames, the second position coordinate value of the plurality of joints obtained from the first image frame, or a variation value of the sensor measurement value for each image frame.

In an embodiment of the disclosure, the external device may be a wearable device worn on at least one region among a wrist, a finger, or a palm of the user and may include the IMU sensor configured to obtain a measurement value of 6 degrees of freedom (6 DoF) for at least one joint among the plurality of joints.

In an embodiment of the disclosure, the at least one processor may be configured to determine whether it is necessary to correct at least one three-dimensional position coordinate value obtained from the first image frame, based on whether the hand is not detected from the first image frame or whether the three-dimensional position coordinate value of the at least one joint is not obtained.

In an embodiment of the disclosure, the at least one processor may be configured to calculate a difference value between the first position coordinate value and the second position coordinate value and compare the calculated difference value with a preset threshold, and determine, based on a result of the comparing, whether it is necessary to correct the three-dimensional position coordinate value of the at least one joint.

In an embodiment of the disclosure, the at least one processor may be configured to determine whether it is necessary to correct the three-dimensional position coordinate value of the at least one joint, based on whether a position of the hand is moved between inside and outside of a field of view (FOV) area of the camera.

In an embodiment of the disclosure, the at least one processor may be configured to determine whether it is necessary to correct the three-dimensional position coordinate value of the at least one joint, based on a difference value between the first position coordinate value obtained when the position of the hand is located outside the FOV area of the camera and the second position coordinate value obtained from the first image frame obtained inside the FOV area.

In an embodiment of the disclosure, the at least one processor may be configured to sample the obtained sensor measurement value based on a frame per second (FPS) rate of the plurality of image frames, synchronize the sensor measurement value with the plurality of image frames by matching the sampled sensor measurement value to the plurality of image frames corresponding thereto in order of time, and calculate the variation value of the sensor measurement value for each image frame by using the synchronized sensor measurement value.

In an embodiment of the disclosure, the at least one processor may be configured to apply a first weight to the first position coordinate value and apply a second weight to the second position coordinate value, and correct the second position coordinate value based on the first position coordinate value weighted with the first weight, the second position coordinate value weighted with the second weight, and the variation value of the sensor measurement value for each image frame.

In an embodiment of the disclosure, the first weight and the second weight may be determined based on at least one of whether the hand of the user is detected in the first image frame and the second image frame, a difference value between the first position coordinate value and the second position coordinate value, or whether the hand of the user is moved inside or outside a FOV area of the camera.

In an embodiment of the disclosure, the at least one processor may be configured to correct a position coordinate value of a representative joint among the second position coordinate values of the plurality of joints, and update the second position coordinate value of each of the other joints among the plurality of joints based on the corrected position coordinate value of the representative joint.

An another aspect of the disclosure provides a method, performed by an augmented reality (AR) device, of obtaining position information about a plurality of joints included in a hand of a user. According to an embodiment of the disclosure, the method includes detecting the hand of the user from a plurality of image frames and obtaining three-dimensional position coordinate values of a plurality of joints included in the detected hand, obtaining a sensor measurement value for at least one joint among the plurality of joints measured by using an inertial measurement unit (IMU) sensor of an external device, determining, based on a result of the detecting of the hand, whether it is necessary to correct a three-dimensional position coordinate value of at least one joint obtained from a first image frame among the plurality of image frames, updating a second position coordinate value by correcting the second position coordinate value according to a result of the determining based on at least one of a first position coordinate value of the plurality of joints obtained from a second image frame previous to a first image frame among the plurality of image frames, the second position coordinate value of the plurality of joints obtained from the first image frame, or a variation value of the sensor measurement value for each image frame, and outputting the updated second position coordinate value.

In an embodiment of the disclosure, the determining of whether it is necessary to correct the three-dimensional position coordinate value of the at least one joint may include determining whether it is necessary to correct at least one three-dimensional position coordinate value obtained from the first image frame, based on whether the hand is not detected from the first image frame or whether the three-dimensional position coordinate value of the at least one joint is not obtained.

In an embodiment of the disclosure, the determining of whether it is necessary to correct the three-dimensional position coordinate value of the at least one joint may include calculating a difference value between the first position coordinate value obtained from the second image frame and the second position coordinate value obtained from the first image frame, comparing the calculated difference value with a preset threshold, and determining, based on a result of the comparing, whether it is necessary to correct the three-dimensional position coordinate value of the at least one joint.

In an embodiment of the disclosure, the determining of whether it is necessary to correct the three-dimensional position coordinate value of the at least one joint may include determining whether it is necessary to correct the three-dimensional position coordinate value of the at least one joint, based on whether a position of the hand is moved between inside and outside of a field of view (FOV) area of the camera.

In an embodiment of the disclosure, the determining of whether it is necessary to correct the three-dimensional position coordinate value of the at least one joint may include determining whether it is necessary to correct the three-dimensional position coordinate value of the at least one joint, based on a difference value between the first position coordinate value obtained when the position of the hand is located outside the FOV area of the camera and the second position coordinate value obtained from the first image frame obtained inside the FOV area.

In an embodiment of the disclosure, the method may further include obtaining the variation value of the sensor measurement value for each image frame, wherein the obtaining of the variation value of the sensor measurement value for each image frame may include sampling the obtained sensor measurement value based on a frame per second (FPS) rate of the plurality of image frames, synchronizing the sensor measurement value with the plurality of image frames by matching the sampled sensor measurement value to the plurality of image frames corresponding thereto in order of time, and calculating the variation value of the sensor measurement value for each image frame by using the synchronized sensor measurement value.

In an embodiment of the disclosure, the updating of the second position coordinate value may include applying a first weight to the first position coordinate value and applying a second weight to the second position coordinate value, and correcting the second position coordinate value based on the first position coordinate value weighted with the first weight, the second position coordinate value weighted with the second weight, and the variation value of the sensor measurement value for each image frame.

In an embodiment of the disclosure, the first weight and the second weight may be determined based on at least one of whether the hand of the user is detected in the first image frame and the second image frame, a difference value between the first position coordinate value and the second position coordinate value, or whether the hand of the user is moved inside or outside a FOV area of the camera.

In an embodiment of the disclosure, the updating of the second position coordinate value may include correcting a position coordinate value of a representative joint among the second position coordinate values of the plurality of joints, and updating the second position coordinate value of each of the other joints among the plurality of joints based on the corrected position coordinate value of the representative joint.

Another aspect of the disclosure provides a computer program product including a computer-readable storage medium, the computer-readable storage medium including instructions readable by an augmented reality (AR) device to allow the AR device to perform: detecting the hand of the user from a plurality of image frames and obtaining three-dimensional position coordinate values of a plurality of joints included in the detected hand, obtaining a sensor measurement value for at least one joint among the plurality of joints measured by using an inertial measurement unit (IMU) sensor of an external device, determining, based on a result of the detecting of the hand, whether it is necessary to correct a three-dimensional position coordinate value of at least one joint obtained from a first image frame among the plurality of image frames, updating a second position coordinate value by correcting the second position coordinate value according to a result of the determining based on at least one of a first position coordinate value of the plurality of joints obtained from a second image frame previous to a first image frame among the plurality of image frames, the second position coordinate value of the plurality of joints obtained from the first image frame, or a variation value of the sensor measurement value for each image frame, and outputting the updated second position coordinate value.

DESCRIPTION OF DRAWINGS

The disclosure may be easily understood through the following detailed description and the accompanying drawings, in which reference numerals refer to structural elements.

FIG. 3 is a flowchart illustrating an operating method of an AR device according to an embodiment of the disclosure.

MODE FOR DISCLOSURE

Figure 1A:
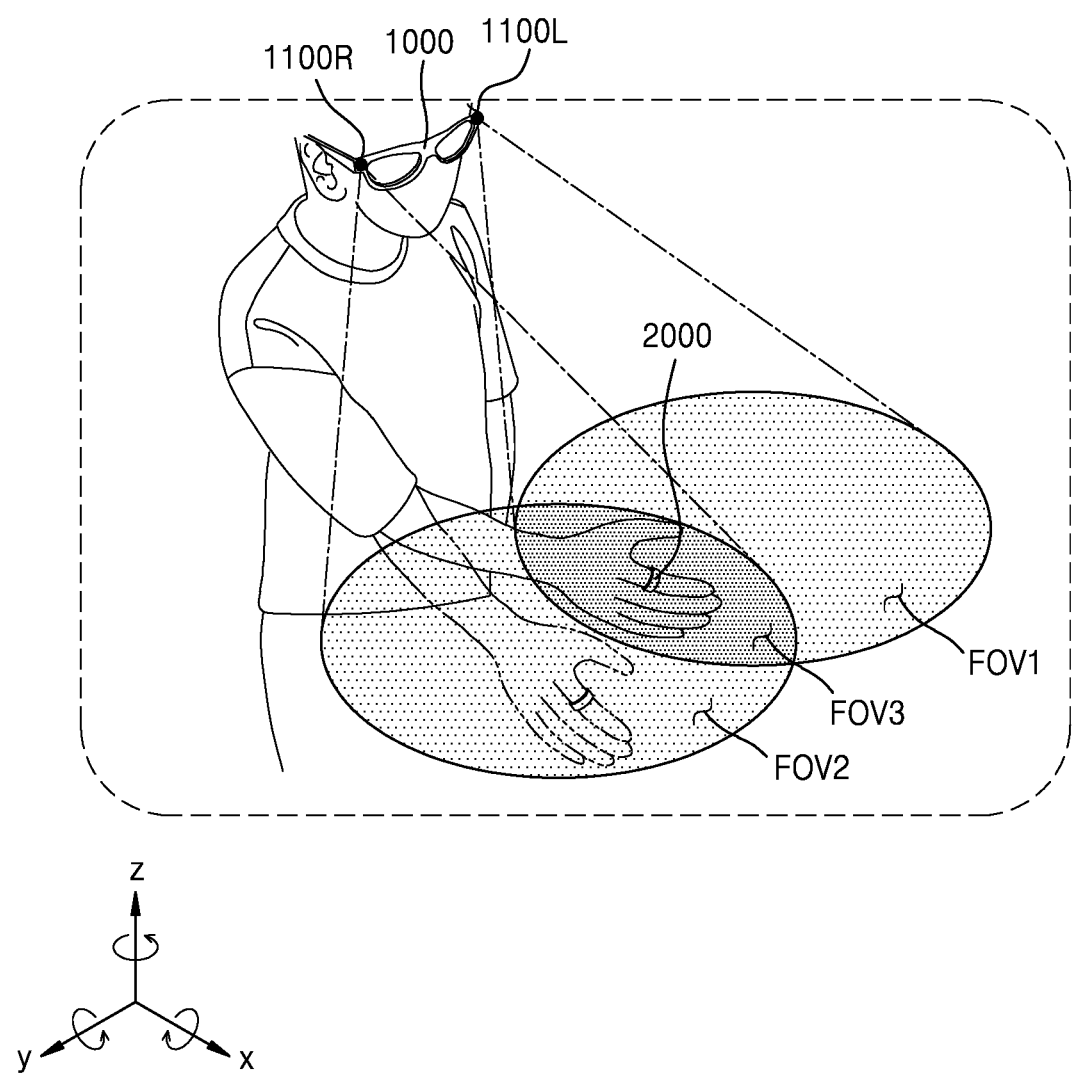
FIG. 1A is a conceptual diagram illustrating an operation in which an augmented reality (AR) device obtains position information about a joint of a hand, according to an embodiment of the disclosure.

The terms used herein are those general terms currently widely used in the art in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

As used herein, the singular forms "a," "an," and "the" may include the plural forms as well, unless the context clearly indicates otherwise. Unless otherwise defined, all terms (including technical or scientific terms) used herein may have the same meanings as commonly understood by those of ordinary skill in the art of the disclosure.

Throughout the disclosure, when something is referred to as "including" an element, one or more other elements may be further included unless specified otherwise. Also, as used herein, terms such as "units" and "modules" may refer to units that perform at least one function or operation, and the units may be implemented as hardware or software or a combination of hardware and software.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some case, the expression "a system configured to . . . " may mean that the system is "capable of . . . " along with other devices or components. For example, "a processor configured to (or set to) perform A, B, and C" may refer to a dedicated processor (e.g., an embedded processor) for performing a corresponding operation, or a general-purpose processor (e.g., a central processing unit (CPU) or an application processor) capable of performing a corresponding operation by executing one or more software programs stored in a memory.

Also, herein, when an element is referred to as being "connected" or "coupled" to another element, the element may be directly connected or coupled to the other element and may also be connected or coupled to the other element through one or more other intervening elements therebetween unless otherwise specified.

Herein, "augmented reality (AR)" may mean displaying a virtual image in a physical environment space of the real world or displaying a real-world object and a virtual image together.

Herein, an "AR device" may be a device capable of representing AR and may generally include not only AR glasses in the shape of glasses worn on the user's face but also a head-mounted display (HMD) apparatus, an AR Helmet, or the like worn on the user's head. However, the disclosure is not limited thereto, and the AR device may include various electronic apparatuses such as a mobile device, a smart phone, a laptop computer, a desktop, a tablet PC, an e-book terminal, a digital broadcasting terminal, a personal digital assistant (PDA), a portable multimedia player (PMP), a navigation device, an MP3 player, a camcorder, an Internet protocol television (IPTV), a digital television (DTV), and a wearable device.

Herein, "field of view (FOV)" may refer to an area in a viewing angle that the user may observe at a time through a camera lens of an AR device.

Herein, a "wearable device" may be a device that is worn on a portion of the user's body and is carried in a worn state. For example, the wearable device may include, but is not limited to, at least one of smart watches, rings, bracelets, anklets, necklaces, contact lenses, clothing-integrated devices (e.g., electronic garments), body-attached devices (e.g., skin pads), or bioimplantable devices (e.g., implantable circuits). In an embodiment of the disclosure, the wearable device may include an inertial measurement unit (IMU) sensor.

Hereinafter, embodiments of the disclosure will be described in detail with reference to the accompanying drawings so that those of ordinary skill in the art may easily implement the embodiments of the disclosure. However, the disclosure may be embodied in many different forms and should not be construed as being limited to the embodiments set forth herein.

Hereinafter, embodiments of the disclosure will be described in detail with reference to the accompanying drawings.

FIG. 1A is a conceptual diagram illustrating an operation in which an AR device 1000 obtains position information about a joint of a hand, according to an embodiment of the disclosure.

Figure 1B:
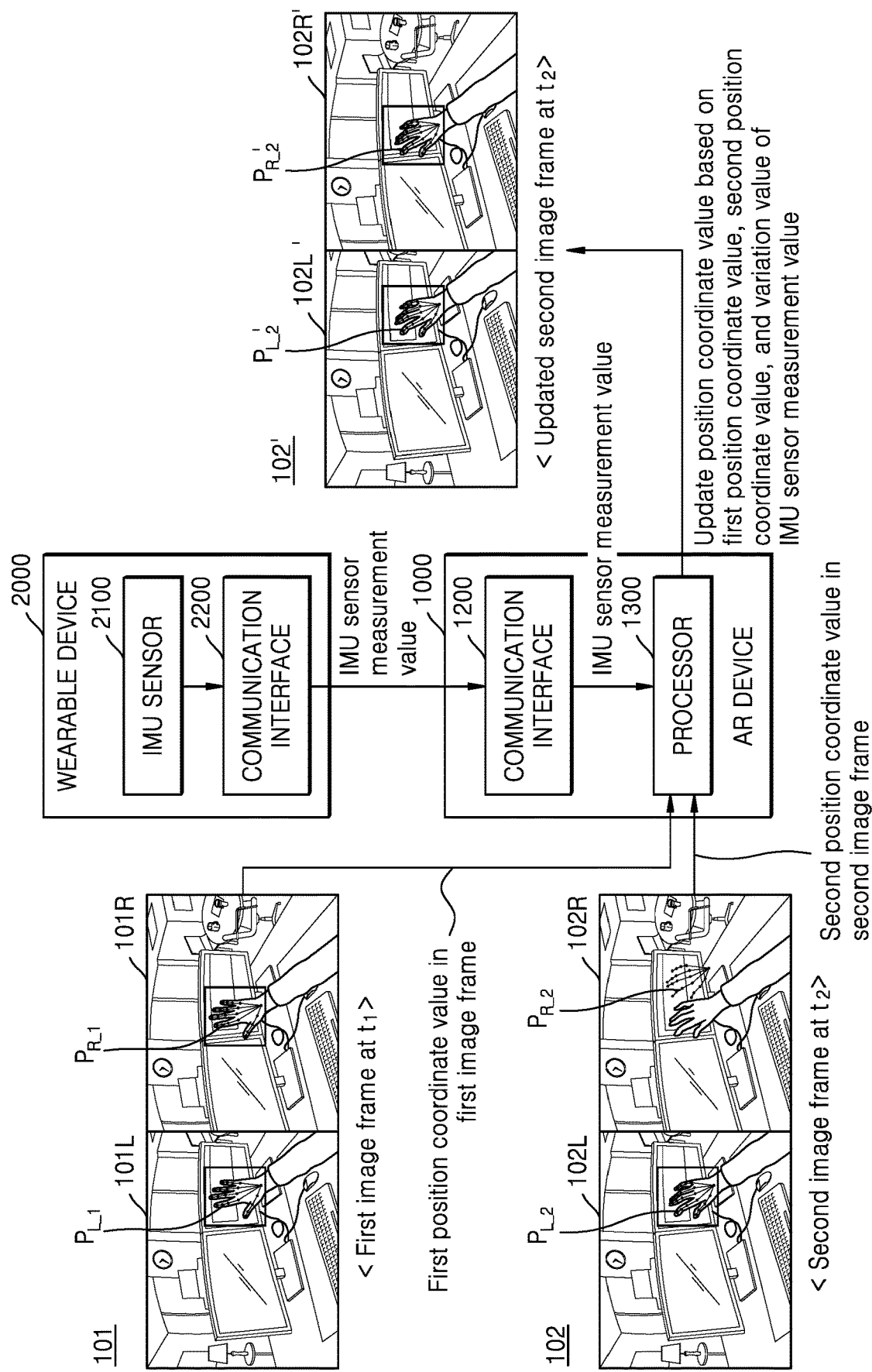
FIG. 1B is a diagram illustrating an operation in which an AR device updates position information of a joint of a hand by using a sensor measurement value obtained from a wearable device, according to an embodiment of the disclosure.

FIG. 1B is a diagram illustrating an operation in which the AR device 1000 updates position information of a joint of a hand by using a sensor measurement value obtained from a wearable device 2000, according to an embodiment of the disclosure.

Referring to FIG. 1A, the AR device 1000 may be AR glasses in the shape of glasses worn on the user's face. In an embodiment of the disclosure, the AR device 1000 may be implemented as a device such as a head-mounted display (HMD) apparatus or an AR helmet worn on the user's head. However, the disclosure is not limited thereto, and the AR device 1000 may include, for example, various electronic apparatuses such as a mobile device, a smart phone, a laptop computer, a desktop, a tablet PC, an e-book terminal, a digital broadcasting terminal, a personal digital assistant (PDA), a portable multimedia player (PMP), a navigation device, an MP3 player, a camcorder, an Internet protocol television (IPTV), a digital television (DTV), and a wearable device.

The AR device 1000 may include a plurality of cameras 1100L and 1100R. The AR device 1000 may obtain a plurality of image frames by photographing the user's hand by using the plurality of cameras 1100L and 1100R. Although FIG. 1A illustrates that the AR device 1000 includes a plurality of cameras including a left camera 1100L and a right camera 1100R, the disclosure is not limited thereto. In an embodiment of the disclosure, the AR device 1000 may include a single camera or may include three or more multi-cameras.

The AR device 1000 may detect the user's hand from the plurality of image frames by using an artificial intelligence (AI) model. The AI model may include an object detection model based on deep learning. In an embodiment of the disclosure, the AR device 1000 may detect the hand from each of the plurality of image frames through inference based on the object detection model.

However, the disclosure is not limited thereto, and the AR device 1000 may detect the user's hand from the plurality of image frames by using a well-known image processing technology.

The AR device 1000 may obtain position information about a plurality of feature points included in the detected hand from the plurality of image frames. Herein, the 'key-point (feature point)' may refer to a point in an image that is distinguished from the surrounding background or is easily identified, and in the case of the hand, the plurality of feature points may be a plurality of joints included in the hand. Herein, the 'joint' may be a portion where a plurality of bones included in the hand are connected to each other and may refer to one or more regions included in the finger, the back of the hand, or the palm. According to an embodiment of the disclosure, the AR device 1000 may obtain a two-dimensional position coordinate value that is position information on the x axis and y axis of a plurality of joints included in the hand according to the result of hand detection. Although FIGS. 1A and 1B illustrate joint portions in the hand, the disclosure is not limited thereto, embodiments of the disclosure may be applied to other body regions of a human body and other joints in the other regions of a human body.

Through stereo mapping, the AR device 1000 may obtain a z-axis position coordinate value, which is a depth value of a plurality of joints included in the hand, from a left image obtained through the left camera 1100L and a right image obtained through the right camera 1100R. However, the disclosure is not limited thereto, and the AR device 1000 may include a depth sensor and may obtain a z-axis position coordinate value, which is depth value information about a plurality of joints included in the hand, through the depth sensor.

The AR device 1000 may obtain an IMU sensor measurement value from an external device. In an embodiment of the disclosure, the external device may be the wearable device 2000 worn on a portion of the user's body. In the embodiment illustrated in FIG. 1A, the wearable device 2000 may be a smart ring worn on the user's finger. However, the disclosure is not limited thereto, and in other embodiments of the disclosure, the wearable device 2000 may include at least one of smart watches, bracelets, anklets, necklaces, contact lenses, clothing-integrated devices (e.g., electronic garments), body-attached devices (e.g., skin pads), or bioimplantable devices (e.g., implantable circuits).

Referring to FIG. 1A and FIG. 1B together, the wearable device 2000 may include an IMU sensor 2100 and a communication interface 2200.

The IMU sensor 2100 may be a sensor configured to measure the movement speed, direction, angle, and gravitational acceleration of a device through a combination of an accelerometer, a gyroscope, and a magnetometer. The wearable device 2000 may use the IMU sensor 2100 to obtain information about the position and movement of the finger. In an embodiment of the disclosure, the wearable device 2000 may use the IMU sensor 2100 to obtain 6 degree of freedom (6 DoF) measurement values including three-dimensional position coordinate values (x-axis, y-axis, and z-axis coordinate values) and three-axis angular velocity values (roll, yaw, and pitch) of the finger.

Through the communication interface 2200, the wearable device 2000 may be paired with the AR device 1000 through a short-range wireless communication network. In an embodiment of the disclosure, the communication interface 2200 may be wirelessly connected to a communication interface 1200 of the AR device 1000 and may perform data communication through a short-range wireless communication network including at least one of WiFi, Wi-Fi Direct (WFD), Bluetooth, Bluetooth Low Energy (BLE), Near Field Communication (NFC), ZigBee, Ant+, or microwave (μWave). The wearable device 2000 may transmit data about the 6 DoF measurement value measured through the IMU sensor 2100 to the communication interface 1200 of the AR device 1000 through the communication interface 2200.

The AR device 1000 may include the communication interface 1200 and a processor 1300. The processor 1300 may determine whether it is necessary to correct the three-dimensional position coordinate value of the hand obtained from the plurality of image frames and may correct the three-dimensional position coordinate value according to the determination result. In an embodiment of the disclosure, the processor 1300 may determine that it is necessary to correct the three-dimensional position coordinate value of the plurality of joints, when the hand is not detected from the plurality of image frames, when the three-dimensional position coordinate values of the plurality of joints are not correctly detected, or when the hand is moved outside the FOV area of one of the plurality of cameras 1100L and 1100R.

Referring to FIG. 1B, in a first image frame 101 at a first time point $t_1$ among the plurality of image frames, three-dimensional position coordinate values $P_{L\_1}$ and $P_{R\_1}$ about the plurality of joints included in the hand may be correctly obtained. In an embodiment of the disclosure, the first image frame 101 may include a first left image frame 101L and a first right image frame 101R, a three-dimensional position coordinate value $P_{L\_1}$ about the plurality of joints may be obtained in the first left image frame 101L, and a three-dimensional position coordinate value $P_{R\_1}$ about the plurality of joints may be obtained in the first right image frame 101R. A second image frame 102 at a second time point $t_2$ after the first time point $t_1$ may include a second left image frame 102L and a second right image frame 102R, and a three-dimensional position coordinate value $P_{L\_2}$ about the plurality of joints may be obtained in the second left image frame 102L. However, in the second right image frame 102R, the user's hand may not be detected and accordingly the three-dimensional position coordinate value of the plurality of joints included in the hand may not be obtained. The processor 1300 may determine that it is necessary to correct of the position coordinate value of the joint, when the hand is not detected in at least one of the second left image frame 102L or the second right image frame 102R at the second time point $t_2$ or when the three-dimensional position coordinate value of the plurality of joints is not obtained. The processor 1300 may identify the second image frame 102 at the second time point $t_2$ as an image frame requiring correction.

FIG. 1B illustrates that each of the first image frame 101 and the second image frame 102 includes a plurality of image frames; however, this illustrates a case where the AR device 1000 includes the left camera 1100L and the right camera 1100R, and the disclosure is not limited to the illustration in FIG. 1B. In an embodiment of the disclosure, the first image frame 101 and the second image frame 102 may be configured as a single image frame or may be configured as three or more image frames.

When it is determined that it is necessary to correct the three-dimensional position coordinate value of the plurality of joints included in the hand, the processor 1300 may correct the three-dimensional position coordinate value of the plurality of joints based on the three-dimensional position coordinate value for each of the plurality of image frames and the measurement value data of the IMU sensor 2100 obtained from the wearable device 2000. In an embodiment of the disclosure, the processor 1300 may correct a second position coordinate value by using a second position coordinate value, which is a set of three-dimensional position coordinate values of the plurality of joints obtained from the second image frame at a current time point (e.g., the second time point $t_2$ of FIG. 1B) at which it is determined that it is necessary to correct the three-dimensional position coordinate value of the plurality of joints, a first position coordinate value, which is a set of three-dimensional position coordinate values of the plurality of joints obtained from the first image frame at a previous time point (e.g., the first time point $t_1$ of FIG. 1B) before the current time point, and a variation value of the measurement value of the IMU sensor 2100 for each image frame.

The processor 1300 may obtain the sensor measurement values of the IMU sensor 2100 in real time from the wearable device 2000 through the communication interface 1200. The processor 1300 may synchronize the sensor measurement values obtained in real time, based on a frame per second (FPS) rate of a plurality of image frames 101 and 102. The processor 1300 may calculate a variation value of the measurement value of the IMU sensor 2100 for each image frame by using the synchronized sensor measurement value.

Referring to the embodiment illustrated in FIG. 1B, the processor 1300 may calculate a variation value of sensor measurement values between the first time point $t_1$ and the second time point $t_2$. By using the calculated variation value of the measurement value, the three-dimensional position coordinate values $P_{L\_1}$ and $P_{R\_1}$ in the first image frame 101, and the three-dimensional position coordinate value $P_{L\_2}$ in the second image frame 102, the processor 1300 may correct the three-dimensional position coordinate value in the second image frame 102 and may obtain updated three-dimensional position coordinate values $P_{L\_2}'$ and $P_{R\_2}'$ through the correction. In an embodiment of the disclosure, the processor 1300 may update the three-dimensional position coordinate value of the plurality of joints by correcting the three-dimensional position coordinate value of a representative joint among the plurality of joints and correcting the three-dimensional position coordinate value of the other joints with respect to the corrected three-dimensional position coordinate value based on the position relationship between the representative joint and the other joints.

The AR device 1000 may output an updated second image frame 102' and the updated three-dimensional position coordinate values $P_{L\_2}'$ and $P_{R\_2}'$ about the plurality of joints. The AR device 1000 may provide the output three-dimensional position coordinate values $P_{L\_2}'$ and $P_{R\_2}'$ to an application performing a hand interaction for detecting the user's pose or gesture on a real-world object or a virtual image and may provide an AR service by executing the application.

In order to ensure the freedom of both hands of the user, a general AR device does not use a separate external input device but uses a vision-based hand tracking technology for detecting the user's hand from an image obtained by using a camera. When a three-dimensional position coordinate value of a joint of the hand is obtained by using a camera, detection is possible only in an FOV area of the camera. For example, in the case of an AR device that obtains an image by using the left camera 1100L and the right camera 1100R and obtains a three-dimensional position coordinate value of a plurality of joints included in the hand through stereo mapping, the hand may be correctly detected only in an area (see FOV3 in FIG. 1A) where an FOV (see FOV1 in FIG. 1A) of the left camera 1100L and an FOV (see FOV2 in FIG. 1A) of the right camera 1100R overlap each other, and the hand may not be correctly detected or the accuracy of the three-dimensional position coordinate value of the joint may decrease remarkably in other areas (e.g., FOV1 and FOV2). When the accuracy of the three-dimensional position coordinate value of the joint of the hand is low, the pose or gesture of the hand may not be detected or may not be correctly detected and accordingly the user satisfaction and the stability of the AR service may decrease.

The AR device 1000 according to the embodiment illustrated in FIGS. 1A and 1B may identify the second image frame 102 among the plurality of image frames in which the hand is not detected or the three-dimensional position coordinate value of the plurality of joints included in the hand are not correctly obtained, may correct the three-dimensional position coordinate value $P_{L\_2}$ in the second image frame 102 based on the variation value of the measurement value of the IMU sensor 2100 obtained from the wearable device 2000, the three-dimensional position coordinate values $P_{L\_1}$ and $P_{R\_1}$ about the plurality of joints obtained in the first image frame 101 at the first time point $t_1$ that is the previous time point, and the three-dimensional position coordinate value $P_{L\_2}$ about the plurality of joints obtained in the second image frame 101 at the second time point $t_2$ that is the current time point, and may obtain the updated three-dimensional position coordinate values $P_{L\_2}'$ and $P_{R\_2}'$ about the plurality of joints according to the correction result. The AR device 1000 according to an embodiment of the disclosure may improve the accuracy of the three-dimensional position information about the plurality of joints by updating the three-dimensional position coordinate value of the plurality of joints included in the hand by using the sensor measurement value of the IMU sensor 2100 received from the wearable device 2000. Also, the AR device 1000 according to an embodiment of the disclosure may improve the user satisfaction and the stability of a hand interaction service through the application by accurately tracking the hand even in an area outside the FOV regardless of the FOV of the cameras 1100L and 1100R.

Figure 2:
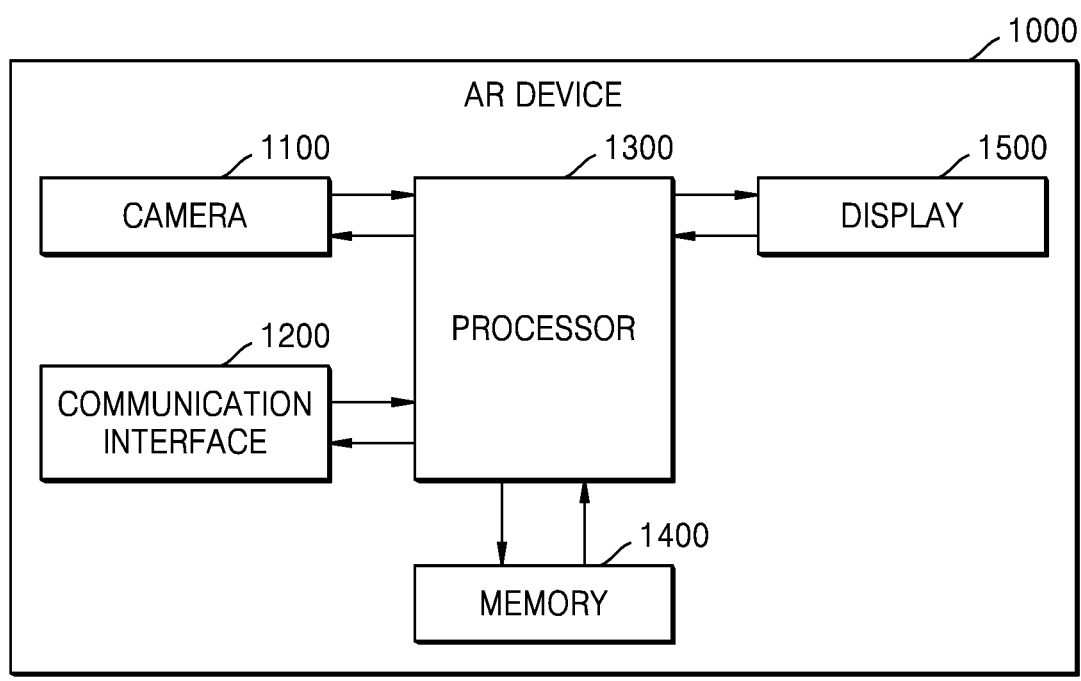
FIG. 2 is a block diagram illustrating components of an AR device according to an embodiment of the disclosure.

FIG. 2 is a block diagram illustrating components of the AR device 1000 according to an embodiment of the disclosure.

Referring to FIG. 2, the AR device 1000 may include a camera 1100, a communication interface 1200, a processor 1300, a memory 1400, and a display 1500. The camera 1100, the communication interface 1200, the processor 1300, the memory 1400, and the display 1500 may be electrically and/or physically connected to each other.

The components illustrated in FIG. 2 are merely an example according to an embodiment of the disclosure, and the components included in the AR device 1000 are not limited to those illustrated in FIG. 2. The AR device 1000 may not include some of the components illustrated in FIG. 2 or may further include components not illustrated in FIG. 2. In an embodiment of the disclosure, the AR device 1000 may further include an IMU sensor module including a geomagnetic sensor, a gyro sensor, and an acceleration sensor (accelerometer).

The camera 1100 may be configured to obtain an image of a real-world object in a real world by photographing the real world. In an embodiment of the disclosure, the camera 1100 may include a lens module, an image sensor, and an image processing module. The camera 1100 may obtain a still image or a video obtained by an image sensor (e.g., CMOS or CCD). The image processing module may process a still image or a video obtained through the image sensor, extract necessary information, and transmit the extracted information to the processor 1300.

In an embodiment of the disclosure, the camera 1100 may include the left camera 1100L (see FIG. 1A) and the right camera 1100R (see FIG. 1B) and may be a stereo camera that uses two cameras to obtain a three-dimensional stereoscopic image of an object to be photographed. However, the disclosure is not limited thereto, and the camera 1100 may include a depth camera for obtaining depth value information of an object to be photographed.

In an embodiment of the disclosure, the camera 1100 may obtain a plurality of image frames by photographing the user's hand in real time by the control of the processor 1300. The camera 1100 may provide data about the plurality of obtained image frames to the processor 1300.

The communication interface 1200 may be configured to perform data communication with an external device (e.g., the wearable device 2000 (see FIGS. 1A and 1B) or a server. In an embodiment of the disclosure, the communication interface 1200 may include a short-range wireless communication module and a mobile communication module.

The short-range wireless communication module may be configured to connect with the external device or the server and perform data communication by using a wireless communication network. The short-range wireless communication module may include, for example, at least one hardware module among WiFi, a Wi-Fi Direct (WFD) communicator, a Bluetooth communicator, a Bluetooth Low Energy (BLE) communicator, a Near Field Communication (NFC) unit, a ZigBee communicator, an Ant+ communicator, or a microwave (μWave) communicator, but is not limited thereto. In an embodiment of the disclosure, the short-range wireless communication module may perform data communication with an external server through a gateway or a router.

In an embodiment of the disclosure, by using at least one short-range wireless communication network among WiFi, Wi-Fi Direct (WFD), Bluetooth, Bluetooth Low Energy (BLE), Near Field Communication (NFC), ZigBee, Ant+, or microwaves (μWave), the AR device 1000 may be paired with the wearable device 2000 and may receive the measurement value data of the IMU sensor 2100 (see FIG. 1B) from the wearable device 2000.

The mobile communication module may be a communication module configured to transmit/receive wireless signals to/from at least one of a base station, an external device, or a server on a mobile communication network. The mobile communication module may transmit/receive data by using, for example, at least one communication method among 5G mmWave communication, 5G Sub 6 communication, Long Term Evolution (LTE) communication, or 3G mobile communication. In an embodiment of the disclosure, the mobile communication module may transmit/receive data to/from the server under the control by the processor 1300.

The processor 1300 may execute one or more instructions of a program stored in the memory 1400. The processor 1300 may include hardware components for performing arithmetic, logic, and input/output operations and signal processing. The processor 1300 may include, for example, at least one of a central processing unit, a microprocessor, a graphic processor (graphics processing unit (GPU)), application specific integrated circuits (ASICs), digital signal processors (DSPs), digital signal processing devices (DSPDs), programmable logic devices (PLDs), or field programmable gate arrays (FPGAs), but is not limited thereto.

Although the processor 1300 is illustrated as one element in FIG. 2, the disclosure is not limited thereto. In an embodiment of the disclosure, the processor 1300 may include one or more processors.

In an embodiment of the disclosure, the processor 1300 may include an AI processor for performing AI learning. In this case, the AI processor may detect the user's hand by using a learning network model of an AI system. The AI processor may be manufactured in the form of a dedicated hardware chip for AI or may be manufactured as a portion of a general-purpose processor (e.g., CPU or application processor) or a dedicated graphics processor (e.g., GPU) and then mounted on the processor 1300 of the AR device 1000.

The memory 1400 may store instructions constituting an application for allowing the AR device 1000 to obtain position information about the joint of the user's hand. In an embodiment of the disclosure, the memory 1400 may store instructions and program codes readable by the processor 1300. In the following embodiments, the processor 1300 may be implemented by executing the instructions or program codes stored in the memory 1400.

The memory 1400 may include, for example, at least one type of storage medium among flash memory type, hard disk type, multimedia card micro type, card type memory (e.g., SD or XD memory), random access memory (RAM), static random access memory (SRAM), read-only memory (ROM), electronically erasable programmable read-only memory (EEPROM), programmable read-only memory (PROM), or optical disk. In an embodiment of the disclosure, the AR device 1000 may be connected through a network and may operate a web storage or a cloud server for performing a storage function.

The processor 1300 may implement the following embodiments by executing the instructions or program codes stored in the memory 1400.

The processor 1300 may obtain a plurality of image frames about the user's hand from the camera 1100. In an embodiment of the disclosure, the camera 1100 may obtain a plurality of image frames by photographing the user's hand in the real world in real time and may provide the plurality of obtained image frames to the processor 1300.

The processor 1300 may detect the user's hand from the plurality of image frames. In an embodiment of the disclosure, the processor 1300 may detect the hand from the plurality of image frames by using an AI model. The "AI model" may include a deep neural network model trained to detect an object from the image data input from the camera 1100 and classify the object according to type. The AI model may be stored in the memory 1400 but is not limited thereto. In an embodiment of the disclosure, the AI model may be stored in the external server, and the AR device 1000 may transmit the image data to the server and may receive information about the type of an object, which is an inference result, from the AI model of the server.

The AI model may include a deep neural network model including model parameters trained by applying tens of thousands to hundreds of millions of images as input data and applying the label value of an object included in the image as an output value (groundtruth). The deep neural network model may include, for example, at least one of Convolutional Neural Network (CNN), Recurrent Neural Network (RNN), Restricted Boltzmann Machine (RBM), Deep Belief Network (DBN), Bidirectional Recurrent Deep Neural Network (BRDNN), or Deep Q-networks. However, the AI model is not limited to the deep neural network model but may include at least one of Support Vector Machine (SVM), linear regression, logistic regression, naive Bayes classification, random forests, decision tree, or k-nearest neighbors algorithm.

The processor 1300 may include an AI processor. The AI processor may be configured in the form of a dedicated hardware chip for AI and may be included in the processor 1300 as a portion of a general-purpose processor (e.g., CPU or application processor) or a dedicated graphics processor (e.g., GPU). By using the AI model, the AI processor may detect the user's hand from the plurality of image frames obtained through the camera 1100.

The processor 1300 may obtain position information of a plurality of feature points included in the hand detected by using the AI model. In an embodiment of the disclosure, the "keypoint (feature point)" may refer to a point in an image that is distinguished from the surrounding background or is easily identified, and in the case of the hand, the plurality of feature points may be a plurality of joints included in the hand. Herein, the 'joint' may be a portion where a plurality of bones included in the hand are connected to each other and may refer to one or more regions included in the finger, the back of the hand, or the palm. In an embodiment of the disclosure, the processor 1300 may obtain, from the plurality of image frames, a two-dimensional position coordinate value that is position information on the x axis and y axis of a plurality of joints included in the hand according to the result of hand detection.

The processor 1300 may obtain a z-axis position coordinate value that is a depth value of the plurality of joints included in the hand, based on a two-dimensional position coordinate value of the joint obtained from the left image obtained through the left camera 1100L (see FIG. 1A), a two-dimensional position coordinate value of the joint obtained from the right image obtained through the right camera 1100R (see FIG. 1A), a distance difference (baseline) between the left camera 1100L and the right camera 1100R, and a focal length of each of the left camera 1100L and the right camera 1100R. The stereo mapping technique will be described below in detail with reference to FIGS. 4A to 4C. The processor 1300 may obtain a z-axis position coordinate value of the plurality of joints included in the hand by using the stereo mapping technology and accordingly may obtain a three-dimensional position coordinate value of the plurality of joints.

However, the disclosure is not limited thereto, and the AR device 1000 may further include a depth camera and the processor 1300 may obtain a z-axis position coordinate value, which is depth value information about the plurality of joints included in the hand, through the depth camera.

In the above embodiments, it has been described that the processor 1300 detects the user's hand by using the AI model and obtains the three-dimensional position coordinate value of the plurality of joints included in the detected hand; however, the disclosure is not limited to the above embodiments. In an embodiment of the disclosure, by using the known image processing technology, the processor 1300 may detect the user's hand from the plurality of image frames and may obtain three-dimensional position coordinate value of the plurality of joints included in the hand.

Based on the result of hand detection, the processor 1300 may determine whether it is necessary to correct at least one three-dimensional position coordinate value among three-dimensional position coordinate values of the plurality of joints obtained from the plurality of image frames. The processor 1300 may determine whether it is necessary to correct at least one three-dimensional position coordinate value, based on whether the hand is not detected from at least one image frame among the plurality of image frames or whether the three-dimensional position coordinate value of at least one joint is not obtained. In an embodiment of the disclosure, the processor 1300 may identify an image frame among the plurality of image frames in which the hand is not detected or the three-dimensional position coordinate value of at least one joint among the plurality of joints included in the hand is not obtained and may determine the three-dimensional position coordinate value of at least one joint obtained from the identified image frame as position information requiring correction.

In an embodiment of the disclosure, the processor 1300 may calculate a difference value between the three-dimensional position coordinate value of the plurality of joints obtained from the image frame at a current time point $t_0$ identified as the image frame requiring correction and the three-dimensional position coordinate value of the plurality of joints obtained from the image frame at a previous time point $t_{-1}$ and may compare the calculated difference value with a preset threshold to determine whether it is necessary to correct the three-dimensional position coordinate value of the plurality of joints obtained from the image frame at the current time point. A particular embodiment in which the processor 1300 determines whether it is necessary to correct the three-dimensional position coordinate value of at least one joint based on whether the hand is not detected in the plurality of image frames or whether the three-dimensional position coordinate value of at least one joint included in the hand is not obtained will be described below in detail with reference to FIGS. 7 to 9.

In an embodiment of the disclosure, the processor 1300 may determine whether it is necessary to correct the three-dimensional position coordinate value of at least one joint among the plurality of joints, based on whether the position of the hand detected in the plurality of image frames moves between the inside and the outside of the FOV area of the camera 1100. A particular embodiment in which the processor 1300 determines whether it is necessary to correct the three-dimensional position coordinate values of at least one joints included in the hand, based on whether the hand moves between the inside and the outside of the FOV area of the camera 1100 will be described below in detail with reference to FIG. 10.

When it is determined that correction is necessary, the processor 1300 may correct the three-dimensional position coordinate value of the plurality of joints based on the three-dimensional position coordinate value of the plurality of joints obtained from the image frame among the plurality of image frames determined as requiring correction, the three-dimensional position coordinate value of the plurality of joints obtained from the image frame at a previous time point, and the sensor measurement value of the IMU sensor obtained from the external device. In an embodiment of the disclosure, when the image frame determined as requiring correction is the second image frame at the current time point $t_0$ and the three-dimensional position coordinate value of the plurality of joints obtained from the second image frame is the second position coordinate value, the processor 1300 may correct the second position coordinate value based on the first position coordinate value, which is the three-dimensional position coordinate value of the plurality of joints obtained from the first image frame at the previous time point $t_{-1}$ before the current time point $t_0$, the second position coordinate value, and the variation value of the measurement value of the IMU sensor 2100 (see FIG. 1B) obtained from the wearable device 2000 (see FIGS. 1A and 1B).

The processor 1300 may obtain the measurement value of the IMU sensor 2100 in real time from the wearable device 2000 through the communication interface 1200. The wearable device 2000 may be, for example, a watch-type device 2000a (see FIG. 11A) worn on the user's wrist or a smart ring 2000b (see FIG. 11B) worn on the user's finger. Through the communication interface 1200, the processor 1300 may be wirelessly paired with the wearable device 2000 and may perform data communication. Through the communication interface 1200, the processor 1300 may obtain data about the 6 DoF measurement value measured through the IMU sensor 2100 (see FIG. 1B) from the wearable device 2000. A particular embodiment in which the processor 1300 obtains data of the sensor measurement value from the wearable device 2000 will be described below in detail with reference to FIGS. 11A and 11B.

In an embodiment of the disclosure, the processor 1300 may synchronize the measurement values of the IMU sensor 2100 obtained in real time with the plurality of image frames 101 and 102, based on the FPS rate of the plurality of image frames 101 and 102. For example, when the IMU sensor 2100 of the wearable device 2000 performs sensing 500 times per second to obtain 500 sensor measurement values per second, the processor 1300 may synchronize the 500 sensor measurement values per second with the plurality of image frames according to the FPS rate of the plurality of image frames. For example, when the FPS rate of the plurality of image frames obtained through the camera 1100 is 30, the processor 1300 may sample the 500 sensor measurement values as 30 values per second, and may match the sampled 30 sensor measurement values to the plurality of image frames corresponding thereto to synchronize the sensor measurement value and the image frame. A particular embodiment in which the processor 1300 synchronizes the sensor measurement value and the image frame will be described below in detail with reference to FIGS. 12 and 13.

The processor 1300 may calculate a variation value of the measurement value of the IMU sensor 2100 for each image frame by using the sensor measurement value synchronized with the image frame. In an embodiment of the disclosure, the processor 1300 may correct the second position coordinate value of the plurality of joints obtained from the second image frame, by using a difference value between the first sensor measurement value synchronized with the first image frame and the second sensor measurement value synchronized with the second image frame.

The processor 1300 may apply a first weight to the first position coordinate value and apply a second weight to the second position coordinate value and may correct the second position coordinate value based on the first position coordinate value weighted with the first weight, the second position coordinate weighted with the second weight, and the variation value of the sensor measurement value for each image frame. In an embodiment of the disclosure, the first weight and the second weight may be determined based on at least one of whether the user's hand is detected in the first image frame and the second image frame, the difference value between the first position coordinate value and the second position coordinate value, or whether the position of the user's hand moves between the inside and the outside of the FOV area of the camera 1100. For example, when the hand is not detected in the second image frame, the processor 1300 may determine the second weight applied to the second image frame as 0 or a small value close to 0 and may correct the second position coordinate value with respect to the first position coordinate value obtained in the first image frame. As an example, when the user's hand is located outside the FOV area of the camera 1100 in the first image frame and then the hand moves into the FOV of the camera 1100 in the second image frame, the processor 1300 may apply the first weight applied to the first position coordinate value as 0 and may determine the second weight applied to the second position coordinate value as 1 to correct the second position coordinate value with respect to the second position coordinate value.

The processor 1300 may correct the three-dimensional position coordinate value of a representative joint among the plurality of joints included in the hand and may update the three-dimensional position coordinate value of each of the other joints among the plurality of joints based on the corrected position coordinate value of the representative joint. In an embodiment of the disclosure, based on the position relationship between the representative joint and the other joints, the processor 1300 may update the three-dimensional position coordinate value of the plurality of joints by correcting the three-dimensional position coordinate values of the other joints with respect to the corrected three-dimensional position coordinate value of the representative joint.

The processor 1300 may output the updated three-dimensional position coordinate value of the plurality of joints. In an embodiment of the disclosure, the processor 1300 may provide the updated three-dimensional position coordinate value of the plurality of joints to an application for performing a hand interaction. By executing the application, the processor 1300 may detect the pose or gesture of the hand on a real-world object or a virtual image and may perform a function or operation corresponding to the detected pose or gesture.

In an embodiment of the disclosure, the processor 1300 may display a graphic user interface (UI) representing the updated three-dimensional position coordinate value of the plurality of joints on the display 1500.

The display 1500 may be configured to display the plurality of image frames obtained through the camera 1100. The display 1500 may display a marker in an area representing the user's hand detected from the plurality of image frames. In an embodiment of the disclosure, the display 1500 may display a graphic UI representing the plurality of joints included in the hand, under the control by the processor 1300.

In an embodiment of the disclosure, the display 1500 may display a virtual image under the control by the processor 1300.

For example, when the AR device 1000 is AR glasses in the form of glasses, the display 1500 may include a lens, a waveguide, and an optical module (e.g., a projector).

However, the disclosure is not limited thereto, and the display 1500 may include a physical device including at least one of a liquid crystal display, a thin film transistor-liquid crystal display, an organic light-emitting diode (OLED) display, a flexible display, a three-dimensional (3D) display, or an electrophoretic display. In an embodiment of the disclosure, the display 1500 may include a touch screen including a touch interface. When the display 1500 includes a touch screen, the display 1500 may be a component integrated with a user input unit including a touch panel.

FIG. 3 is a flowchart illustrating an operating method of the AR device 1000 according to an embodiment of the disclosure.

In operation S310, the AR device 1000 may obtain the three-dimensional position coordinate value of the plurality of joints included in the user's hand from the plurality of image frames. In an embodiment of the disclosure, the AR device 1000 may obtain the plurality of image frames by photographing the user's hand located in the real world, in real time by using the camera. The AR device 1000 may detect the user's hand from the plurality of image frames. In an embodiment of the disclosure, the AR device 1000 may detect the hand from the plurality of image frames by using the AI model. The "AI model" may include a deep neural network model trained to detect an object from the image data input from the camera and classify the object according to type. The deep neural network model may include, for example, at least one of Convolutional Neural Network (CNN), Recurrent Neural Network (RNN), Restricted Boltzmann Machine (RBM), Deep Belief Network (DBN), Bidirectional Recurrent Deep Neural Network (BRDNN), or Deep Q-networks. The AR device 1000 may detect the hand from the plurality of image frames by using the deep neural network model.

The AR device 1000 may obtain position information of a plurality of feature points included in the hand detected by using the AI model. In an embodiment of the disclosure, the "keypoint (feature point)" may refer to a point in an image that is distinguished from the surrounding background or is easily identified, and in the case of the hand, the plurality of feature points may be a plurality of joints included in the hand. Herein, the 'joint' may be a portion where a plurality of bones included in the hand are connected to each other and may refer to one or more regions included in the finger, the back of the hand, or the palm. In an embodiment of the disclosure, the AR device 1000 may obtain a two-dimensional position coordinate value that is position information on the x axis and y axis of the plurality of joints included in the hand according to the result of hand detection from the plurality of image frames. The AR device 1000 may obtain the z-axis position coordinate value of the plurality of joints by performing stereo mapping on the left image obtained through the left camera 1100L (see FIG. 1A) and the right image obtained from the right camera 1100R (see FIG. 1A).

However, the disclosure is not limited thereto, and the AR device 1000 may further include a depth camera and may obtain the z-axis position coordinate value, which is depth value information about the plurality of joints included in the hand, through the depth camera.

In an embodiment of the disclosure, by using the known image processing technology, the AR device 1000 may detect the user's hand from the plurality of image frames and may obtain three-dimensional position coordinate value of the plurality of joints included in the hand.

In operation S320, the AR device 1000 may obtain the sensor measurement value about at least one joint among the plurality of joints measured by using the IMU sensor of the external device. In an embodiment of the disclosure, the external device may be a wearable device worn on at least one region among the user's wrist, finger, or palm. The wearable device may be, for example, a smart ring worn on the user's finger. However, the disclosure is not limited thereto, and the wearable device 2000 may include at least one of smart watches, bracelets, anklets, necklaces, contact lenses, clothing-integrated devices (e.g., electronic garments), body-attached devices (e.g., skin pads), or bioimplantable devices (e.g., implantable circuits). The AR device 1000 may be wirelessly paired with the communication interface 1200 of the AR device 1000 and may perform data communication through a short-range wireless communication network including at least one of WiFi, Wi-Fi Direct (WFD), Bluetooth, Bluetooth Low Energy (BLE), Near Field Communication (NFC), ZigBee, Ant+, or microwave (μWave). The AR device 1000 may obtain data about the 6 DoF measurement value measured through the IMU sensor 2100 (see FIG. 1B) from the paired wearable device. Here, the "6 DoF measurement value" may include the three-dimensional position coordinate values (x-axis, y-axis, and z-axis coordinate values) and three-axis angular velocity values (roll, yaw, and pitch) of the plurality of joints included in the hand.

In operation S330, the AR device 1000 may determine whether it is necessary to correct the three-dimensional position coordinate value, based on the result of hand detection. The AR device 1000 may determine whether it is necessary to correct at least one three-dimensional position coordinate value among the three-dimensional position coordinate values of the plurality of joints obtained from the plurality of image frames. In an embodiment of the disclosure, the AR device 1000 may determine whether it is necessary to correct at least one three-dimensional position coordinate value, based on whether the hand is not detected from at least one image frame among the plurality of image frames or whether the three-dimensional position coordinate value of at least one joint is not obtained. In an embodiment of the disclosure, the AR device 1000 may identify an image frame among the plurality of image frames in which the hand is not detected or the three-dimensional position coordinate value of at least one joint among the plurality of joints included in the hand is not obtained and may determine the three-dimensional position coordinate value of at least one joint obtained from the identified image frame as position information requiring correction.

In an embodiment of the disclosure, the AR device 1000 may identify an image frame among the plurality of image frames in which the three-dimensional position coordinate value of the plurality of joints included in the hand is remarkably different from the three-dimensional position coordinate value obtained from the previous image frame because the hand is misdetected and may determine the three-dimensional position coordinate value in the identified image frame as position information requiring correction.

In an embodiment of the disclosure, the AR device 1000 may determine whether it is necessary to correct the three-dimensional position coordinate value of at least one joint, based on whether the position of the hand detected in the plurality of image frames moves between the inside and the outside of the FOV area of the camera 1100.

In operation S340, according to the result of determination, based on the first position coordinate value obtained from the first image frame at the first time point, the second position coordinate value obtained from the second image frame at the second time point, and the variation value of the sensor measurement value for each image frame, the AR device 1000 may update the second position coordinate value by correcting the second position coordinate value. In an embodiment of the disclosure, when the image frame identified as requiring correction among the plurality of image frames is the second image frame at the current time point to, the AR device 1000 may correct the second position coordinate value based on the first position coordinate value, which is the three-dimensional position coordinate value of the plurality of joints obtained from the first image frame at the previous time point t–1 before the current time point to, the second position coordinate value, and the variation value of the measurement value of the IMU sensor 2100 (see FIG. 1B) obtained from the wearable device 2000. In an embodiment of the disclosure, the AR device 1000 may synchronize the measurement value of the IMU sensor 2100 obtained in real time according to the FPS rate of the plurality of image frames and may calculate the variation value of the sensor measurement value for each image frame by using the synchronized measurement value. The AR device 1000 may correct the second position coordinate value of the plurality of joints obtained from the second image frame, by using a difference value between the first sensor measurement value synchronized with the first image frame and the second sensor measurement value synchronized with the second image frame.

The AR device 1000 may correct the three-dimensional position coordinate value of a representative joint among the plurality of joints included in the hand and may update the three-dimensional position coordinate value of each of the other joints among the plurality of joints based on the corrected position coordinate value of the representative joint. In an embodiment of the disclosure, based on the position relationship between the representative joint and the other joints, the AR device 1000 may update the three-dimensional position coordinate value of the plurality of joints by correcting the three-dimensional position coordinate value of the other joints with respect to the corrected three-dimensional position coordinate value of the representative joint.

In operation S350, the AR device 1000 may output the updated three-dimensional position coordinate value of the plurality of joints. In an embodiment of the disclosure, the AR device 1000 may provide the updated three-dimensional position coordinate value of the plurality of joints to an application for performing a hand interaction. By executing the application, the AR device 1000 may detect the pose or gesture of the hand on a real-world object or a virtual image and may perform a function or operation corresponding to the detected pose or gesture.

Figure 4A:
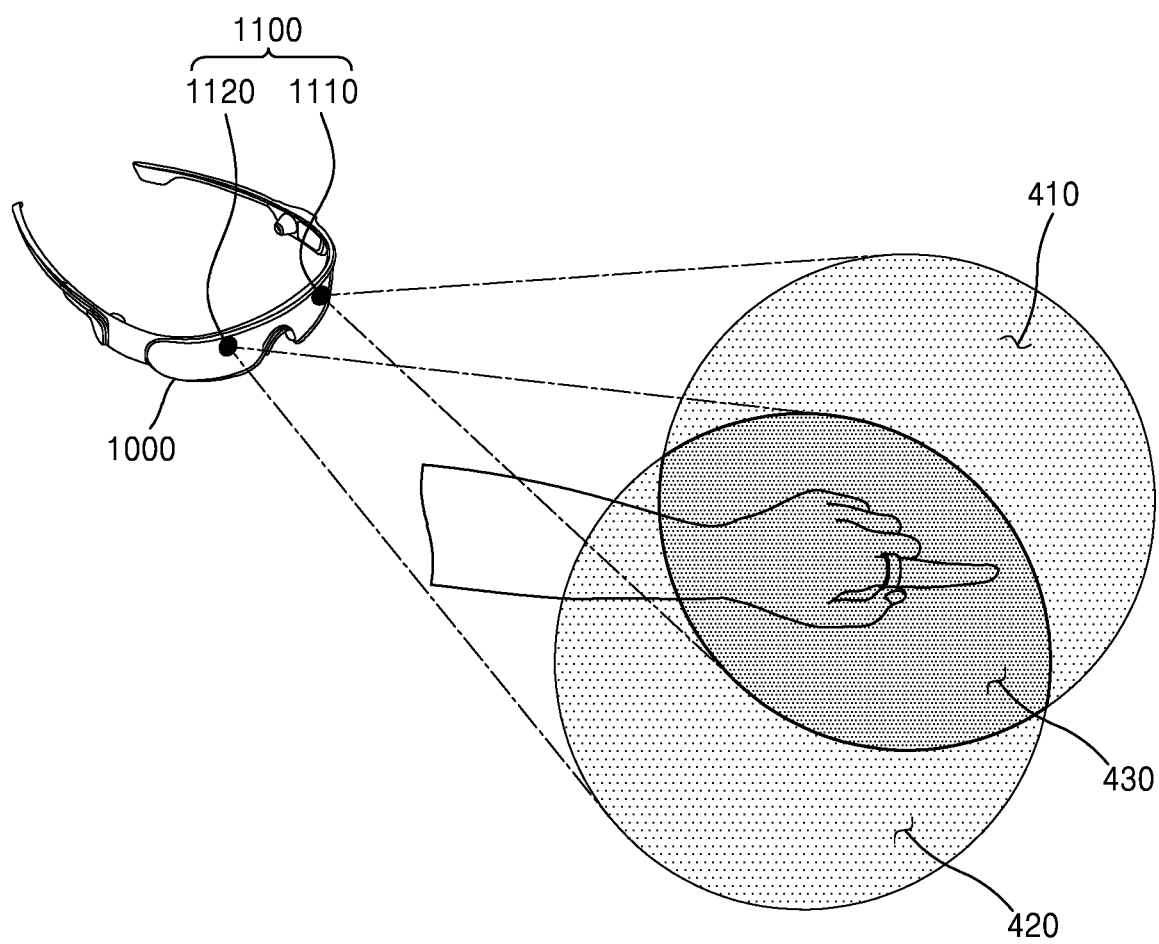
FIG. 4A is a diagram illustrating an area in which an AR device detects a hand through a stereo camera.

FIG. 4A is a diagram illustrating an area in which the AR device 1000 detects a hand through a stereo camera 1100.

Referring to FIG. 4A, the AR device 1000 may obtain a plurality of image frames by photographing the user's hand in real time by using the camera 1100. In an embodiment of the disclosure, the camera 1100 may include a left camera 1110 and a right camera 1120 and may be a stereo camera for obtaining a three-dimensional stereoscopic image of an object to be photographed by using two cameras.

The left camera 1110 may obtain a plurality of left image frames by photographing an object located in the area of a first FOV 410. The left camera 1120 may obtain a plurality of right image frames by photographing an object located in the area of a second FOV 420. The AR device 1000 may detect the hand from each of the plurality of left image frames and the plurality of right image frames and may obtain a two-dimensional position coordinate value including the position coordinate value on the x axis and y axis of the plurality of joints included in the detected hand.

The AR device 1000 may obtain a z-axis position coordinate value of the plurality of joints by using the stereo mapping technology and may obtain a three-dimensional position coordinate value of the plurality of joints. The AR device 1000 may obtain a z-axis position coordinate value, which is a depth value of the plurality of joints, based on the two-dimensional position coordinate value of the plurality of joints obtained from the plurality of left image frames, the two-dimensional position coordinate value of the plurality of joints obtained from the plurality of right image frames, the difference value (baseline) between the left camera 1110 and the right camera 1120, and the focal length of each of the left camera 1110 and the right camera 1120. The stereo mapping technology in which the AR device 1000 obtains the z-axis position coordinate value of the plurality of joints will be described below in detail with reference to FIGS. 4B and 4C.

Figure 4B:
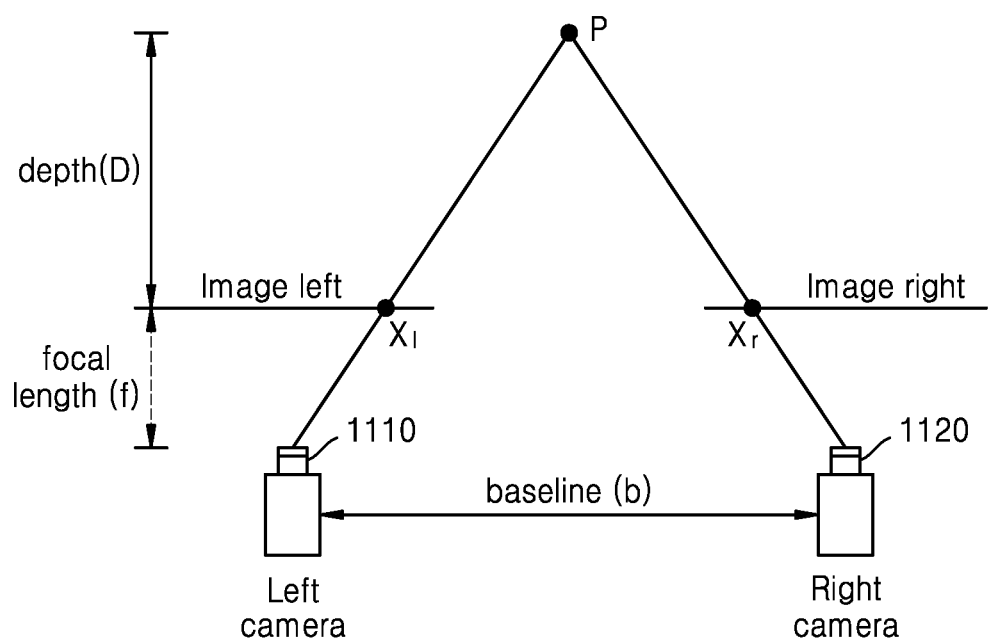
FIG. 4B is a diagram for describing an operation in which an AR device obtains position information of a joint of a hand by using a stereo camera, according to an embodiment of the disclosure.

FIG. 4B is a diagram for describing an operation in which the AR device 1000 obtains position information of a joint of a hand by using the stereo camera 1100 (see FIG. 4A), according to an embodiment of the disclosure.

FIG. 4B illustrates the view of the left camera 1110, the right camera 1120, and a joint P included in the user's hand, from the x-z plane. Referring to FIG. 4B, Equation 1 below may be derived from a triangle formed by the joint P, an x-axis position coordinate value XI of the left image frame, and an x-axis position coordinate value $X_r$ of the right image and a triangle formed by the joint P, the left camera 1110, and the right camera 1120.

$$b + x_r - x_l : b = Z - f : Z \quad \text{[Equation 1]}$$

Here, a depth Z (see FIG. 4C) may be calculated according to Equation 2 below.

$$Z = f * \frac{b}{x_l - x_r} \quad \text{[Equation 2]}$$

Thereafter, p=$(X_l, Y_l, Z, 1)$ may be configured by using the obtained depth value Z and the two-dimensional position coordinate value $(X_l, Y_l)$ obtained from the left camera 1110.

Next, the two-dimensional coordinates obtained from the left camera 1110 may be converted into three-dimensional coordinates according to Equation 3 below.

$$(x, y, z) = (R \times p) + T \quad \text{[Equation 3]}$$

$$R = \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix}$$

$$T = \begin{bmatrix} 1 & 0 & 0 & -C_x \\ 0 & 1 & 0 & -C_y \\ 0 & 0 & 1 & -C_z \\ 0 & 0 & 0 & 1 \end{bmatrix}$$

In Equation 3, R may represent an axis rotation angle parameter from the left camera 1110 to a preset origin (e.g., a center point or a middle point between the left camera 1110 and the right camera 1120), and T may represent a distance parameter from the left camera 1110 to a preset origin (e.g., a center point or a middle point between the left camera 1110 and the right camera 1120).

Figure 4C:
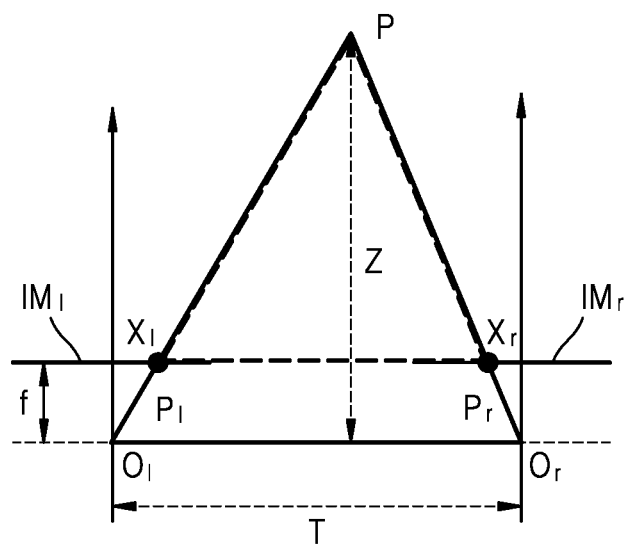
FIG. 4C is a diagram for describing an operation in which an AR device obtains position information of a joint of a hand from an image obtained through a stereo camera, according to an embodiment of the disclosure.

FIG. 4C is a diagram for describing an operation in which the AR device 1000 obtains position information of a joint of a hand from an image obtained through the stereo camera 1100 (see FIG. 4A), according to an embodiment of the disclosure.

Referring to FIG. 4C, the three-dimensional coordinates of the corresponding feature point may be calculated from the two-dimensional x-axis position coordinate value $(X_l, X_r)$ of a pair of feature points in two images IM1 and IMr. A triangulation method may be used to calculate the three-dimensional coordinates of the feature point. The left camera 1110 (see FIG. 4B) and the right camera 1120 (see FIG. 4B) may be respectively arranged at points Ol and Or. In this case, Equation 4 below may be obtained according to the ratio of a triangle.

$$\frac{T}{Z} = \frac{T + x_l - x_r}{Z - f} \quad \text{[Equation 4]}$$

$$Z = \frac{f \cdot T}{x_r - x_l}$$

$$x = \frac{f \cdot X}{Z} + p_x$$

When the image obtained by the left camera 1110 is referred to as a left image, the AR device 1000 may obtain two-dimensional coordinates $(X_l, Y_l)$ of a first hand joint having the lower left end of the left image as an origin. Likewise, when the image obtained by the right camera 1120 is referred to as a right image, the AR device 1000 may obtain two-dimensional coordinates $(X_r, Y_r)$ of a second hand joint having the lower left end of the right image as an origin.

When the depth value Z is obtained by performing an operation only on the coordinates on the x axis, Z may become the coordinates on the z axis and the coordinates on the y axis may be calculated by using the same. Thus, even when an operation is performed only on the coordinates of the x axis, the three-dimensional position coordinate value of the joint P may be obtained.

Figure 5:
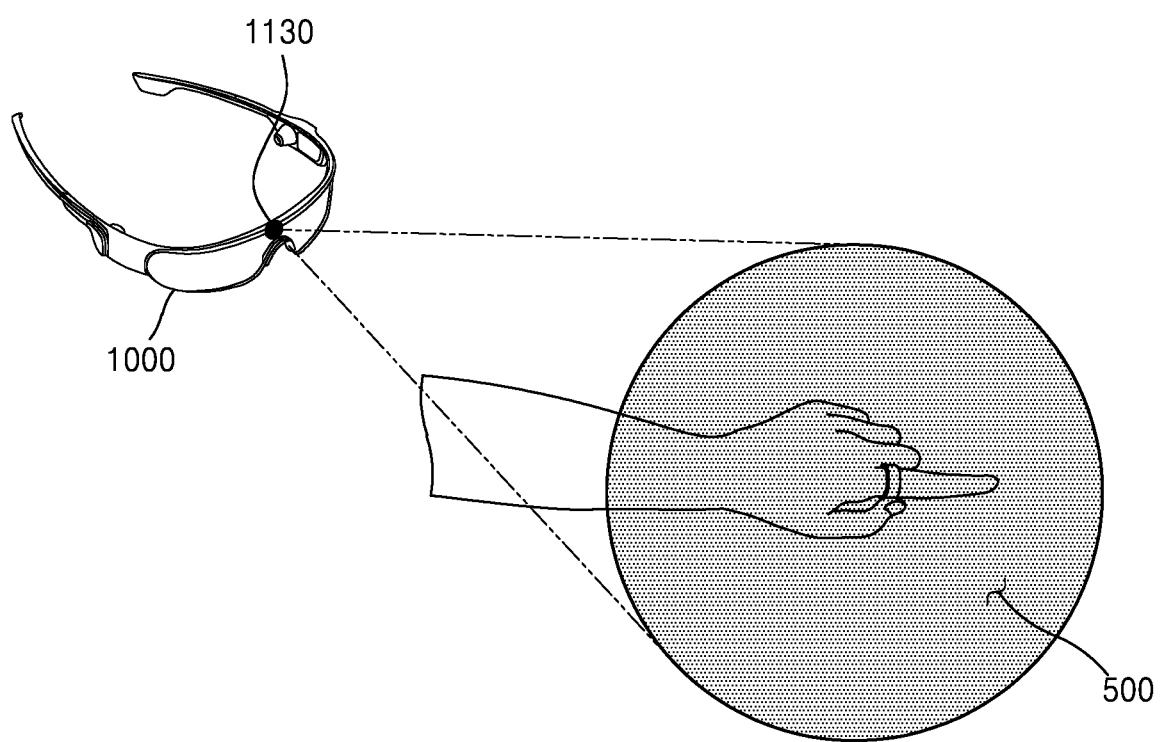
FIG. 5 is a diagram illustrating an area in which an AR device detects a hand through a depth camera.

FIG. 5 is a diagram illustrating an area in which the AR device 1000 detects a hand through a depth camera 1130.

Referring to FIG. 5, the AR device 1000 may include a depth camera 1130. The depth camera 1130 may be a camera for measuring a depth value of a real-world object viewed by the user. The depth camera 1130 may scan a physical space or environment, measure a depth value of a real-world object arranged in the physical space or environment according to a three-dimensional position coordinate value of the real-world object, and arrange the measured depth value according to each of the three-dimensional position coordinate values to generate a depth map.

The depth camera 1130 may include, for example, at least one of a Time-of-Flight (ToF) sensor or a Light Detection And Ranging (LiDAR) sensor and may measure the three-dimensional depth value of an object by using the ToF sensor or the LiDAR sensor.

The AR device 1000 may obtain a plurality of image frames by photographing the user's hand located in an FOV area 500 by using the depth camera 1130. The AR device 1000 may detect the hand from the plurality of image frames and may obtain a three-dimensional position coordinate value including a depth value about the plurality of joints included in the detected hand. Unlike the embodiment illustrated in FIGS. 4A to 4C, the AR device 1000 according to the embodiment illustrated in FIG. 5 may not separately obtain a left image and a right image and may obtain a single image frame and may obtain a three-dimensional position coordinate value of the joint of the hand from the single image frame.

Figure 6:
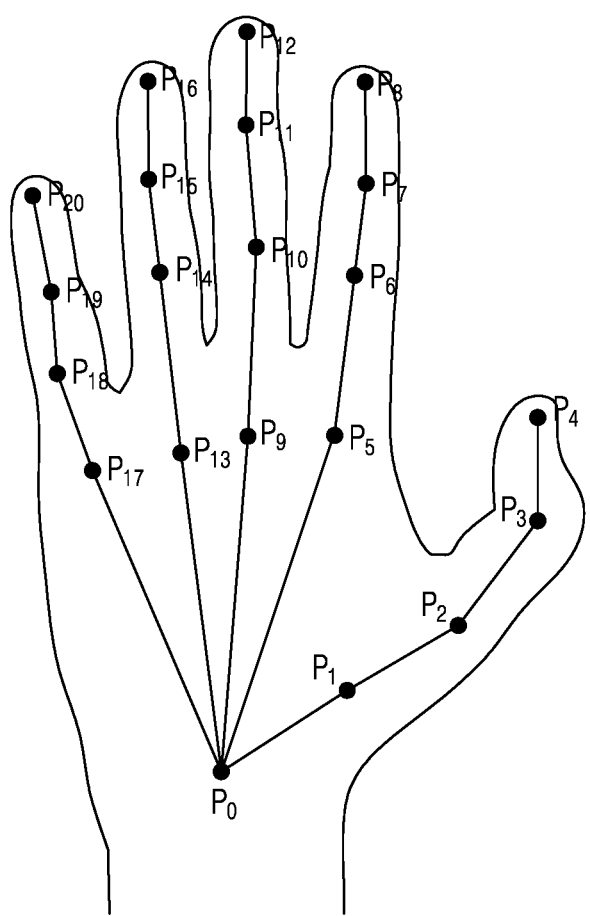
FIG. 6 is a diagram illustrating position coordinate values of a plurality of joints included in a hand detected by an AR device, according to an embodiment of the disclosure.

FIG. 6 is a diagram illustrating position coordinate values $P_0$ to $P_{20}$ about a plurality of joints included in a hand detected by the AR device 1000, according to an embodiment of the disclosure.

Referring to FIG. 6, the AR device 1000 may detect the user's hand from the plurality of image frames and may obtain position coordinate values $P_0$ to $P_{20}$ about the plurality of joints included in the hand. Herein, the 'joint' may be a portion where a plurality of bones included in the hand are connected to each other and may refer to one or more regions included in the finger, the back of the hand, or the palm.

In the embodiment illustrated in FIG. 6, the AR device 1000 may obtain a position coordinate value $P_0$ about a joint of the wrist and may obtain position coordinate values $P_1$, $P_5$, $P_9$, $P_{13}$, and $P_{17}$ about a plurality of joints included in the palm. The AR device 1000 may obtain position coordinate values of three joints with respect to each of five fingers. For example, the AR device 1000 may obtain position coordinate values of $P_2$, $P_3$, and $P_4$ with respect to the thumb, obtain position coordinate values of $P_6$, $P_7$, and $P_8$ with respect to the index finger, obtain position coordinate values of $P_{10}$, $P_{11}$, and $P_{12}$ with respect to the middle finger, obtain position coordinate values of $P_{14}$, $P_{15}$, and $P_{16}$ with respect to the ring finger, and obtain position coordinate values of $P_{18}$, $P_{19}$, and $P_{20}$ with respect to the little finger.

The AR device 1000 may obtain three-dimensional position coordinate values including position coordinate values of the x axis, y axis, and z axis about each of 21 joints.

Although FIG. 6 illustrates that the AR device 1000 obtains the position coordinate values $P_0$ to $P_{20}$ about 21 joints included in the user's hand, this is merely an example and the number of joints is not limited to 21. For instance, according to another example embodiment, the AR device 1000 may obtain the position coordinate values of joints included in another body region of a user, such as the user's leg/foot. According to another example embodiment, the AR device 1000 may obtain the position coordinate values of joints included in both hands of the user. Also, according to another example embodiment, the AR device 1000 may obtain the position coordinate values of less than 21 joints or more than 21 joints.

Figure 7:
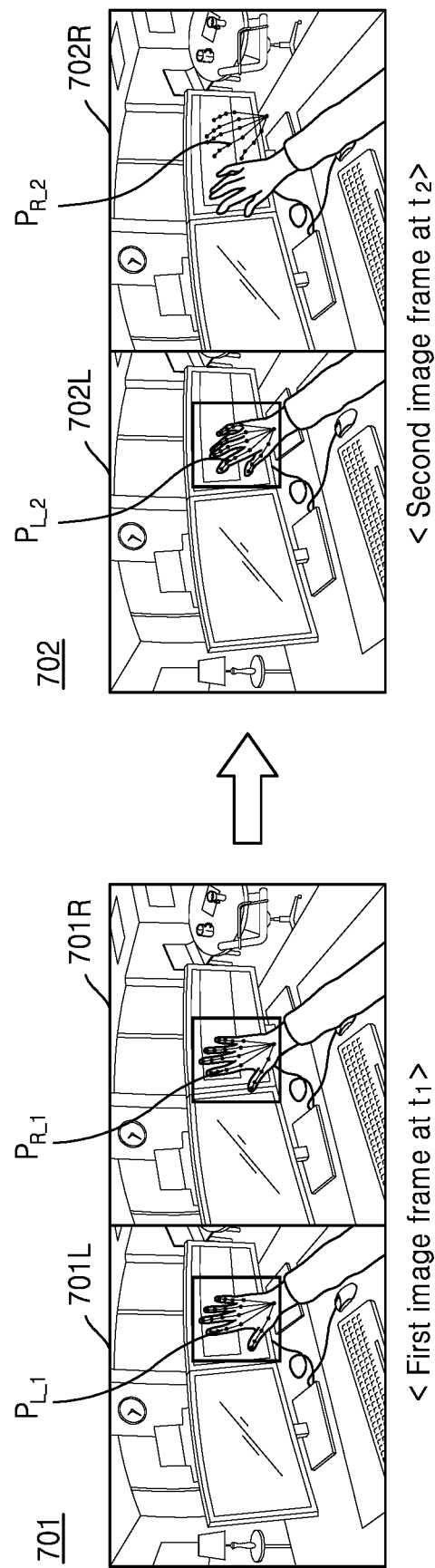
FIG. 7 is a diagram illustrating an operation in which an AR device determines whether it is necessary to correct a position coordinate value of a joint of a hand, according to an embodiment of the disclosure.

FIG. 7 is a diagram illustrating an operation in which the AR device 1000 determines whether it is necessary to correct a position coordinate value of a joint of a hand, according to an embodiment of the disclosure.

The AR device 1000 may determine whether it is necessary to correct the three-dimensional position coordinate value, based on whether the three-dimensional position coordinate value of the joint of the hand obtained from the plurality of image frames is not correctly detected. In an embodiment of the disclosure, the AR device 1000 may determine whether it is necessary to correct the three-dimensional position coordinate value, based on the difference value between the three-dimensional position coordinate value of the joint of the hand obtained from the image frame at the current time point among the plurality of image frames and the three-dimensional position coordinate value of the joint obtained from the image frame at the previous time point.

Referring to FIG. 7, a first image frame 701 obtained at a first time point $t_1$ that is a previous time point may include a first left image frame 701L and a first right image frame 701R. A plurality of first position coordinate values $P_{L\_1}$ and $P_{R\_1}$ about the plurality of joints included in the hand may be respectively obtained from the first left image frame 701L and the first right image frame 701R. A second image frame 702 obtained at a second time point $t_2$ may include a second left image frame 702L and a second right image frame 702R. A plurality of second position coordinate values $P_{L\_2}$ and $P_{R\_2}$ about the plurality of joints included in the hand may be respectively obtained from the second left image frame 702L and the second right image frame 702R. FIG. 7 illustrates an embodiment in which the AR device 1000 obtains a plurality of image frames by using a stereo camera including a left camera and a right camera; however, the disclosure is not limited to the illustration in FIG. 7. In an embodiment of the disclosure, each of the first image frame 701 and the second image frame 702 may be configured as a single image.

When the difference value between the plurality of second position coordinate values $P_{L\_2}$ and $P_{R\_2}$ about the joint of the hand obtained from the second image frame 702 at the second time point $t_2$ that is the current time point and the plurality of first position coordinate values $P_{L\_1}$ and $P_{R\_1}$ about the joint of the hand obtained from the first image frame 701 at the first time point $t_1$ that is the previous time point exceeds a preset threshold, the AR device 1000 may identify the second image frame 702 as an image frame requiring correction and may determine that it is necessary to correct the plurality of second position coordinate values $P_{L\_2}$ and $P_{R\_2}$. A particular method by which the AR device 1000 determines whether it is necessary to correct the second position coordinate values $P_{L\_2}$ and $P_{R\_2}$ based on the difference value between the first position coordinate values $P_{L\_1}$ and $P_{R\_1}$ and the second position coordinate values $P_{L\_2}$ and $P_{R\_2}$ will be described below in detail with reference to FIG. 8.

Figure 8:
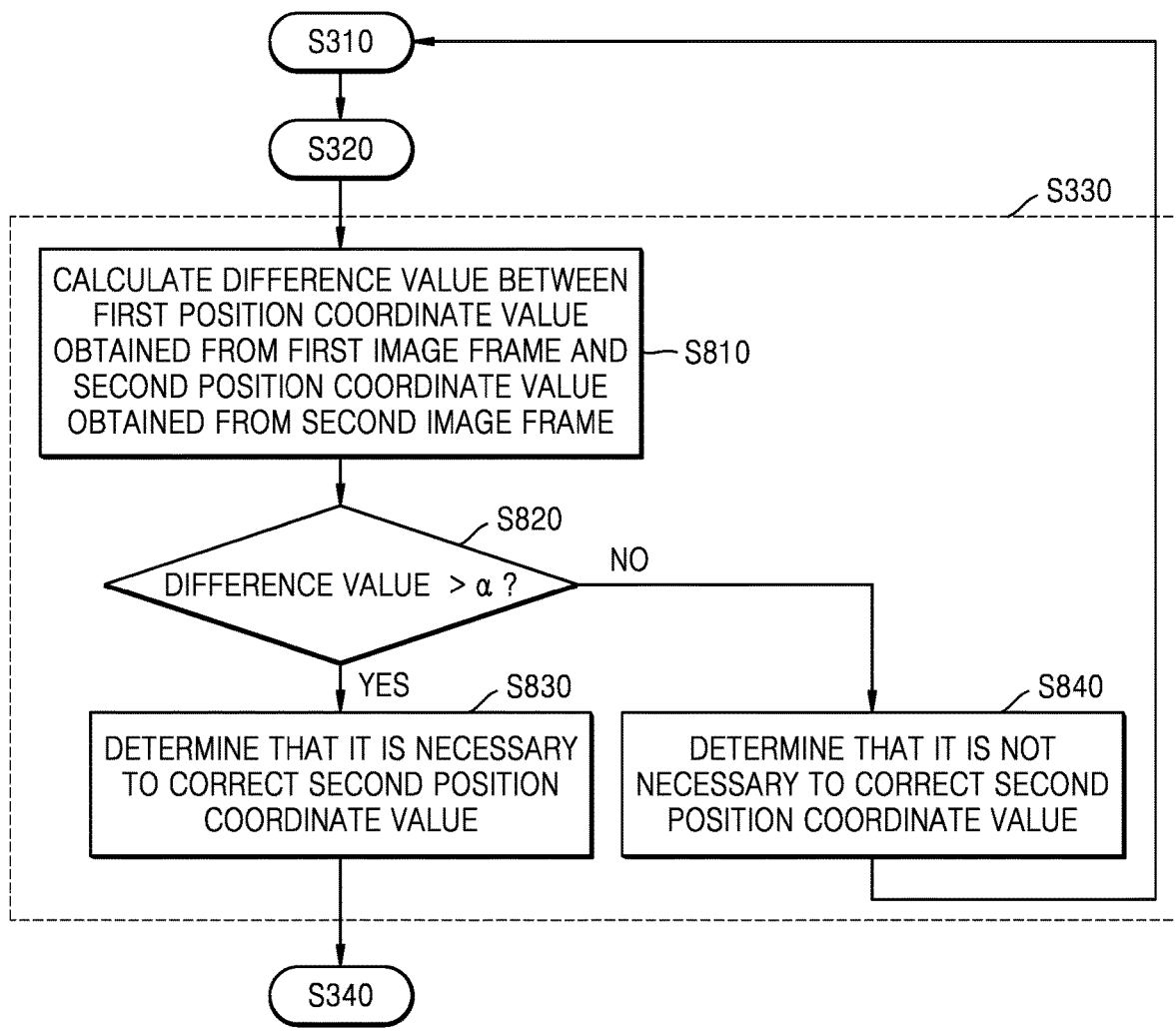
FIG. 8 is a flowchart illustrating a method by which an AR device determines whether it is necessary to correct a position coordinate value of a joint of a hand, according to an embodiment of the disclosure.

FIG. 8 is a flowchart illustrating a method by which the AR device 1000 determines whether it is necessary to correct a position coordinate value of a joint of a hand, according to an embodiment of the disclosure.

Operations S810 to S840 illustrated in FIG. 8 may be detailed operations of operation S330 illustrated in FIG. 3. Operation S810 of FIG. 8 may be performed after operation S320 illustrated in FIG. 3 is performed.

In operation S810, the AR device 1000 may calculate the difference value between the first position coordinate values $P_{L\_1}$ and $P_{R\_1}$ (see FIG. 7) obtained from the first image frame 701 (see FIG. 7) and the second position coordinate values $P_{L\_2}$ and $P_{R\_2}$ (see FIG. 7) obtained from the second image frame 702 (see FIG. 7). In an embodiment of the disclosure, the AR device 1000 may calculate the difference value between the first position coordinate value $P_{L\_1}$ (see FIG. 7) obtained from the first left image frame 701L (see FIG. 7) and the second position coordinate value $P_{L\_2}$ (see FIG. 7) obtained from the second left image frame 702L (see FIG. 7) and may calculate the difference value between the first position coordinate value $P_{R\_1}$ (see FIG. 7) obtained from the first right image frame 701R (see FIG. 7)) and the second position coordinate value $P_{R\_2}$ (see FIG. 7) obtained from the second right image frame 702R (see FIG. 7).

In operation S820, the AR device 1000 may compare the calculated difference value with a preset threshold α.

In operation S830, when the difference value is greater than the threshold α, the AR device 1000 may determine that it is necessary to correct the second position coordinate values $P_{L\_2}$ and $P_{R\_2}$.

In operation S340, the AR device 1000 may correct the second position coordinate values $P_{L\_2}$ and $P_{R\_2}$ and may update the second position coordinate values $P_{L\_2}$ and $P_{R\_2}$, based on the first position coordinate values $P_{L\_1}$ and $P_{R\_1}$ obtained from the first image frame 701 at the previous time point (e.g., the first time point $t_1$ of FIG. 7), the second position coordinate values $P_{L\_2}$ and $P_{R\_2}$ obtained from the second image frame 702 at the current time point (e.g., the second time point $t_2$ of FIG. 7), and the variation value of the sensor measurement value for each image frame.

In operation S840, when the difference value is less than or equal to the threshold α, the AR device 1000 may determine that it is not necessary to correct the second position coordinate values $P_{L\_2}$ and $P_{R\_2}$. According to the result of determination, the AR device 1000 may obtain a plurality of third position coordinate values about the joints of the hand from a third image frame after the current time point (operation S310).

Figure 9:
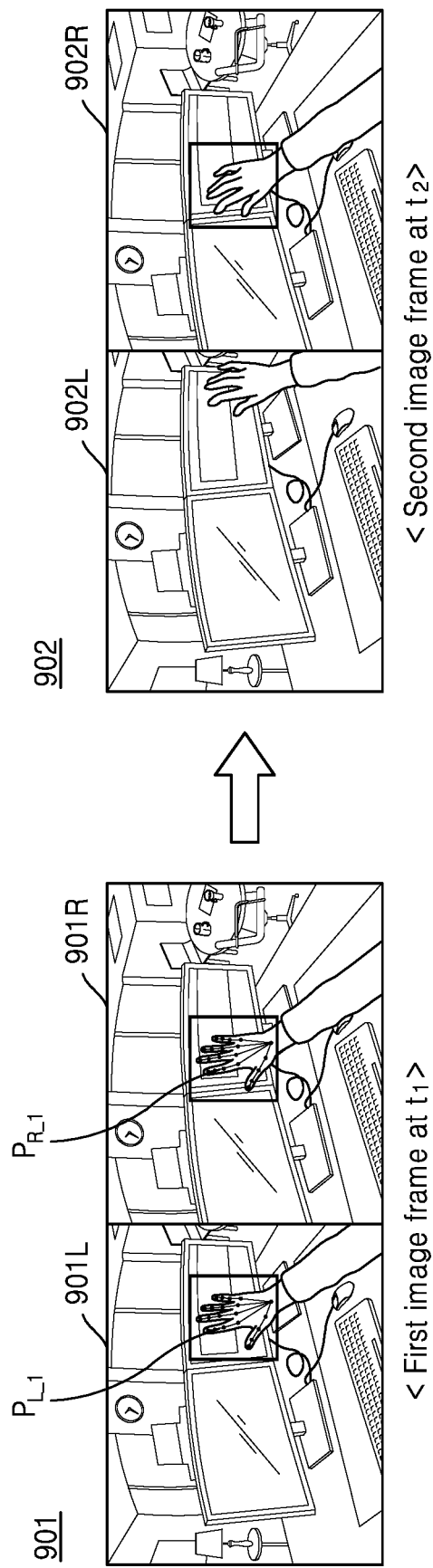
FIG. 9 is a diagram illustrating an operation in which an AR device determines whether it is necessary to correct a position coordinate value of a joint of a hand, according to an embodiment of the disclosure.

FIG. 9 is a diagram illustrating an operation in which the AR device 1000 determines whether it is necessary to correct a position coordinate value of a joint of a hand, according to an embodiment of the disclosure.

The AR device 1000 may determine whether it is necessary to correct the three-dimensional position coordinate value, based on whether the hand is not detected from the plurality of image frames or whether the three-dimensional position coordinate value of the joint of the hand is not obtained. In an embodiment of the disclosure, when the hand is not detected from the image frame at the current time point among the plurality of image frames or when the three-dimensional position coordinate value of the joint of the hand is not obtained, the AR device 1000 may identify the image frame at the current time point as an image frame requiring correction of the three-dimensional position coordinate value and may determine that it is necessary to correct the three-dimensional position coordinate value of the joint of the hand.

Referring to FIG. 9, a first image frame 901 obtained at a first time point $t_1$ that is a previous time point may include a first left image frame 901L and a first right image frame 901R. A plurality of first position coordinate values $P_{L\_1}$ and $P_{R\_1}$ about the plurality of joints included in the hand may be respectively obtained from the first left image frame 901L and the first right image frame 901R. A second image frame 902 obtained at a second time point $t_2$ that is a current time point may include a second left image frame 902L and a second right image frame 902R. In the embodiment illustrated in FIG. 9, the user's hand is not correctly detected in the second left image frame 920L and the hand is detected in the second right image frame 902R, but the three-dimensional position coordinate value of the joint of the hand may not be obtained.

FIG. 9 illustrates an embodiment in which the AR device 1000 obtains a plurality of image frames by using a stereo camera including a left camera and a right camera; however, the disclosure is not limited to the illustration in FIG. 9. In an embodiment of the disclosure, each of the first image frame 901 and the second image frame 902 may be configured as a single image.

The AR device 1000 may identify the second image frame 902, in which the user's hand is not correctly detected or the three-dimensional position coordinate value of the plurality of joints included in the hand is not obtained, as an image frame requiring correction and may determine that it is necessary to correct the three-dimensional position coordinate value of the joint of the hand in the second image frame 902.

In the embodiment illustrated in FIG. 9, because the hand is not detected in the second image frame 902 or the three-dimensional position coordinate value of the joint of the hand is not obtained at all, the AR device 1000 may correct the three-dimensional position coordinate value of the joint of the hand in the second image frame 902 with respect to the first position coordinate values $P_{L\_1}$ and $P_{R\_1}$ obtained from the first image frame 901.

Figure 10:
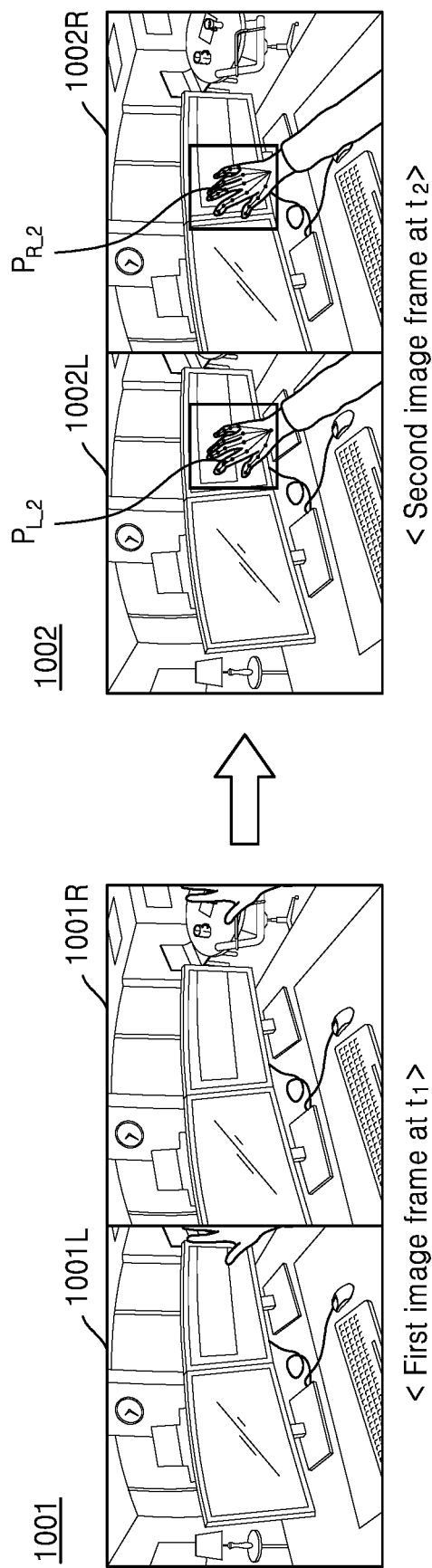
FIG. 10 is a diagram illustrating an operation in which an AR device determines whether it is necessary to correct a position coordinate value of a joint of a hand, according to an embodiment of the disclosure.

FIG. 10 is a diagram illustrating an operation in which the AR device 1000 determines whether it is necessary to correct a position coordinate value of a joint of a hand, according to an embodiment of the disclosure.

The AR device 1000 may determine whether it is necessary to correct the three-dimensional position coordinate value of the joint of the hand, based on whether the position of the hand detected in the plurality of image frames moves between the inside and the outside of the FOV area of the camera 1100 (see FIGS. 1A and 2. In an embodiment of the disclosure, the AR device 1000 may identify the image frame at the current time point as an image frame requiring correction of the three-dimensional position coordinate value, when the position of the hand is inside the FOV area of the camera 1100 and thus the hand is detected in the image frame at the current time point among the plurality of image frames but the position of the hand is outside the FOV area of the camera 1100 and thus the hand is not detected in the image frame at the previous time point. In this case, the AR device 1000 may determine the three-dimensional position coordinate value of the joint of the hand obtained in the identified image frame as position information requiring correction.

Referring to FIG. 10, a first image frame 1001 obtained at a first time point $t_1$ that is a previous time point may include a first left image frame 1001L and a first right image frame 1001R. Because the position of the user's hand is located outside the FOV area of the camera 1100 at the first time point $t_1$, the hand may not be detected in the first left image frame 1001L and the first right image frame 1001R and the three-dimensional position coordinate value of the joint of the hand may not be obtained from the first left image frame 1001L and the first right image frame 1001R. In this case, the AR device 1000 may detect the hand from the first left image frame and the first right image frame at the previous time point (e.g., to) before the first time point $t_1$ and may obtain the three-dimensional position coordinate value of the joint of the hand. In an embodiment of the disclosure, the AR device 1000 may obtain the sensor measurement value measured between the previous time point $t_0$ and the first time point $t_1$ by the IMU sensor 2100 (see FIG. 1B) included in the wearable device 2000 (see FIGS. 1A and 1B) worn on the user's hand. The AR device 1000 may obtain the first position coordinate value of the joint at the first time point $t_1$ by updating the three-dimensional position coordinate value of the joint obtained at the previous time point to by using the measurement value of the IMU sensor 2100 obtained from the wearable device 2000.

A second image frame 1002 obtained at a second time point $t_2$ that is a current time point may include a second left image frame 1002L and a second right image frame 1002R. Referring to the embodiment illustrated in FIG. 10, because the user's hand is moved inside the FOV area of the camera 1100 at the second time point $t_2$, the user's hand may be correctly detected in both of the second left image frame 1002L and the second right image frame 1002R. The second position coordinate values $P_{L\_2}$ and $P_{R\_2}$ about the joint of the hand may be obtained in the second left image frame 1002L and the second right image frame 1002R.

FIG. 10 illustrates an embodiment in which the AR device 1000 obtains a plurality of image frames by using a stereo camera including a left camera and a right camera; however, the disclosure is not limited to the illustration in FIG. 10. In an embodiment of the disclosure, each of the first image frame 1001 and the second image frame 1002 may be configured as a single image.

When the user's hand is located outside the FOV area of the camera 1100 at the first time point $t_1$ and then moves to the inside of the FOV area of the camera 1100 at the second time point $t_2$, the AR device 1000 may identify the second image frame 1002 at the second time point $t_2$ as an image frame requiring correction and may determine that it is necessary to correct the three-dimensional position coordinate value of the joint of the hand obtained from the second image frame 1002. In an embodiment of the disclosure, the AR device 1000 may calculate the difference value between the second position coordinate values $P_{L\_2}$ and $P_{R\_2}$ obtained from the second image frame 1002 obtained inside the FOV area of the camera 1100 and the first position coordinate value at the first time point $t_1$ obtained by updating the three-dimensional position coordinate value of the joint of the hand at the previous time point $t_0$ by using the sensor measurement value of the IMU sensor 2100 of the wearable device 2000 outside the FOV area of the camera 1100. When the calculated difference value is greater than a preset threshold, the AR device 1000 may determine the second position coordinate values $P_{L\_2}$ and $P_{R\_2}$ as position information requiring correction.

In the embodiment illustrated in FIG. 10, when the position of the user's hand is located outside the FOV area of the camera 1100 at the first time point $t_1$ and then moves to the inside of the FOV area of the camera 1100 at the second time point $t_2$, the hand shape may be different at the first time point $t_1$ and the second time point $t_2$. In this case, it may be necessary to correct the second position coordinate values $P_{L\_2}$ and $P_{R\_2}$ obtained at the second time point $t_2$. Even when the wearable device 2000 is worn on the user's hand, because the IMU sensor 2100 of the wearable device 2000 may obtain only the 6 DoF measurement value about a representative joint among the plurality of joints included in the hand, a change in the position coordinate value of the other joints other than the representative joint may not be updated. The AR device 1000 may calculate the difference value between the three-dimensional position coordinate values of the joints of the hand obtained from the second image frame 1002 obtained inside the FOV area of the camera 1100 and the three-dimensional position coordinate values of the joints of the hand at the first time point $t_1$ updated by using the sensor measurement value obtained by the IMU sensor 2100 of the wearable device 2000 outside the FOV area of the camera 1100 and may determine that the hand shape is modified when the difference value in the three-dimensional position coordinate values of the other joints other than the representative joint is great. In this case, the AR device 1000 may determine the second position coordinate values $P_{L\_2}$ and $P_{R\_2}$ obtained at the second time point $t_2$ as position information requiring correction.

In the embodiment illustrated in FIG. 10, because the hand is not detected in the first image frame 1001 because the position of the hand is located outside the FOV area of the camera 1100, the AR device 1000 may correct the three-dimensional position coordinate value of the joint of the hand in the second image frame 1002 with respect to the second position coordinate values $P_{L\_2}$ and $P_{R\_2}$ obtained from the second image frame 1002.

Figure 11A:
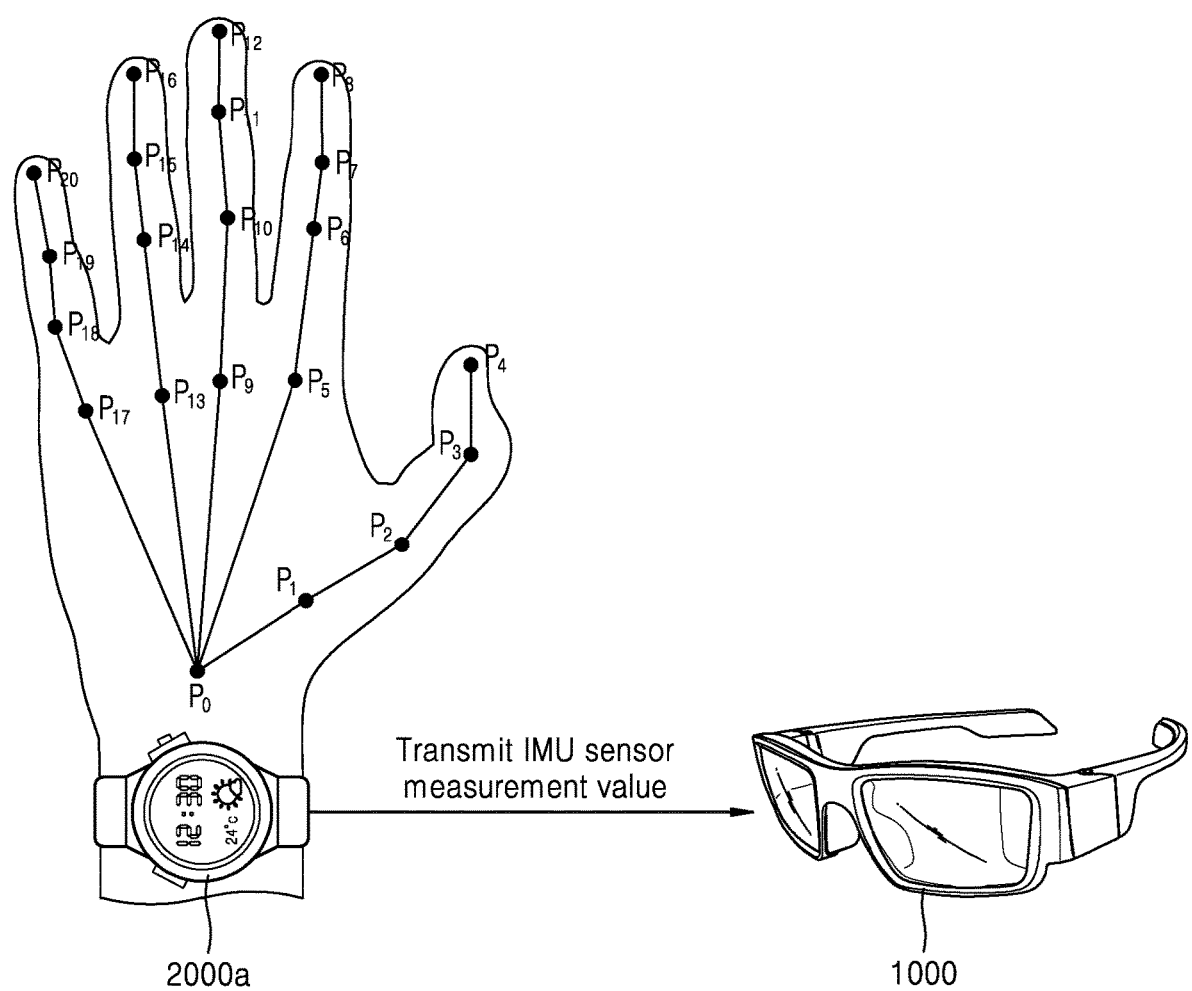
FIG. 11A is a diagram illustrating an operation in which an AR device obtains measurement value data of an inertial measurement unit (IMU) sensor from a wearable device, according to an embodiment of the disclosure.

FIG. 11A is a diagram illustrating an operation in which the AR device 1000 obtains measurement value data of an IMU sensor from a wearable device 2000a, according to an embodiment of the disclosure.

Referring to FIG. 11A, the wearable device 2000a may be worn on the user's wrist. In an embodiment of the disclosure, the wearable device 2000a may be a watch-type device. The wearable device 2000a may include an IMU sensor. The IMU sensor may be configured to measure the movement speed, direction, angle, and gravitational acceleration of the wearable device 2000a through a combination of an acceleration sensor (accelerometer), a gyroscope, and a geomagnetic sensor (magnetometer). In an embodiment of the disclosure, the IMU sensor may include a three-axis acceleration sensor for measuring the acceleration in the x-axis direction, the y-axis direction, and the z-axis direction and a three-axis angular velocity sensor for measuring the roll, pitch, and yaw angular velocities.

The wearable device 2000a may use the IMU sensor to obtain the 6 DoF measurement value including the three-axis angular velocity values (roll, yaw, and pitch) and three-dimensional position coordinate values (x-axis, y-axis, and z-axis coordinate values) about the nearest joint among the plurality of joints included in the hand. In the embodiment illustrated in FIG. 11A, the wearable device 2000a may obtain the 6 DoF measurement value about the position coordinate value of $P_0$ adjacent to the wrist among the position coordinate values $P_0$ to $P_{20}$ about the plurality of joints included in the hand.

The AR device 1000 may be wirelessly paired with the wearable device 2000a and may perform data communication with the wearable device 2000a through a short-range wireless communication network including at least one of WiFi, Wi-Fi Direct (WFD), Bluetooth, Bluetooth Low Energy (BLE), Near Field Communication (NFC), ZigBee, Ant+, or microwave (μWave). The AR device 1000 may receive the IMU sensor measurement value about the position coordinate value of $P_0$ from the wearable device 2000a.

The AR device 1000 may correct not only the position coordinate value of $P_0$ but also the position coordinate values $P_1$ to $P_{20}$ about the other joints by using the IMU sensor measurement value about the position coordinate value of $P_0$ received from the wearable device 2000a. A particular method by which the AR device 1000 corrects the position coordinate values $P_0$ to $P_{20}$ about the plurality of joints included in the hand will be described below in detail with reference to FIGS. 14 and 15.

Figure 11B:
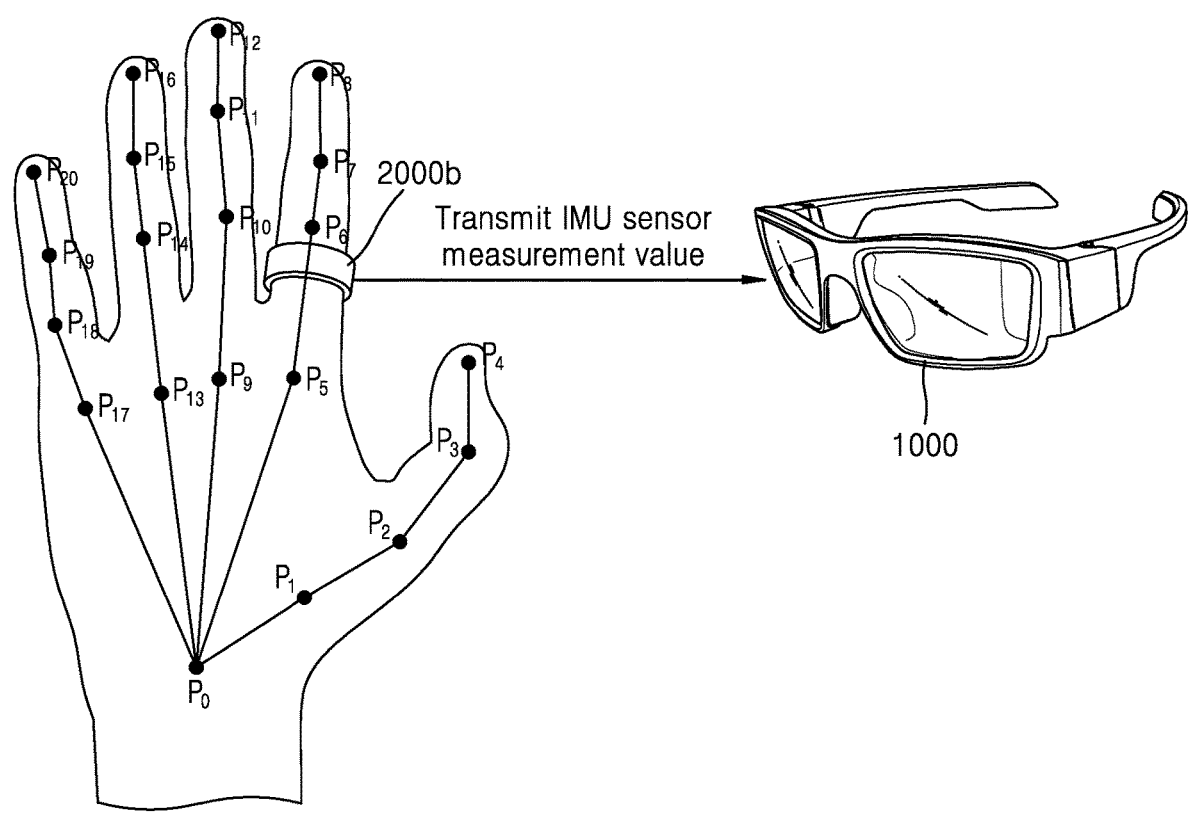
FIG. 11B is a diagram illustrating an operation in which an AR device obtains measurement value data of an IMU sensor from a wearable device, according to an embodiment of the disclosure.

FIG. 11B is a diagram illustrating an operation in which the AR device 1000 obtains measurement value data of an IMU sensor from a wearable device 2000b, according to an embodiment of the disclosure.

Referring to FIG. 11B, the wearable device 2000b may be worn on the user's finger. In an embodiment of the disclosure, the wearable device 2000b may be a smart ring worn on the user's finger. The wearable device 2000b may include an IMU sensor. Because the IMU sensor is the same as that described in FIG. 11A, redundant descriptions thereof will be omitted for conciseness.

The wearable device 2000b may use the IMU sensor to obtain the 6 DoF measurement value including the three-axis angular velocity values (roll, yaw, and pitch) and three-dimensional position coordinate values (x-axis, y-axis, and z-axis coordinate values) about the nearest joint among the plurality of joints included in the hand. In the embodiment illustrated in FIG. 11B, the wearable device 2000b may obtain the 6 DoF measurement value about the position coordinate value of $P_6$ that is the joint between the index finger and the palm among the position coordinate values $P_0$ to $P_{20}$ about the plurality of joints included in the hand.

The AR device 1000 may be wirelessly paired with the wearable device 2000b and may perform data communication with the wearable device 2000b through a short-range wireless communication network including at least one of WiFi, Wi-Fi Direct (WFD), Bluetooth, Bluetooth Low Energy (BLE), Near Field Communication (NFC), ZigBee, Ant+, or microwave (μWave). The AR device 1000 may receive the IMU sensor measurement value about the position coordinate value of $P_6$ from the wearable device 2000b.

The AR device 1000 may correct not only the position coordinate value of $P_6$ but also the position coordinate values $P_0$ to $P_5$ and $P_7$ to $P_{20}$ about the other joints by using the IMU sensor measurement value about the position coordinate value of $P_6$ received from the wearable device 2000b.

In the embodiment illustrated in FIGS. 11A and 11B, the wearable devices 2000a and 2000b are illustrated as watch-type devices or smart rings; however, the wearable device of the disclosure is not limited to the illustration. In an embodiment of the disclosure, the wearable devices 2000a and 2000b may include at least one of bracelets, anklets, necklaces, contact lenses, clothing-integrated devices (e.g., electronic garments), body-attached devices (e.g., skin pads), or bioimplantable devices (e.g., implantable circuits).

In the embodiment illustrated in FIGS. 11A and 11B, the IMU sensor included in the wearable devices 2000a and 2000b may obtain the 6 DoF measurement value in real time a preset number of times during a unit time. For example, the IMU sensor may measure the 6 DoF measurement value about the joint 500 times per second. The wearable devices 2000a and 2000b may transmit data about a plurality of sensor measurement values (e.g., sensor measurement values of 500 times per second) obtained in real time to the AR device 1000. The camera 1100 (see FIGS. 1A and 2) of the AR device 1000 may obtain, for example, an image frame of 30 frames per second or 60 frames per second. In this case, the number of image frames obtained per unit time and the number of sensor measurement values of the IMU sensor received from the wearable devices 2000a and 2000b may vary. In order to correct the three-dimensional position coordinate value of the joint of the hand obtained from the plurality of image frames by using the measurement value data of the IMU sensor, it may be necessary to synchronize the FPS rate of the plurality of image frames with the number of sensor measurement values. A particular embodiment in which the AR device 1000 synchronizes the plurality of image frames with the measurement value data of the IMU sensor obtained in real time will be described below in detail with reference to FIGS. 12 and 13.

Figure 12:
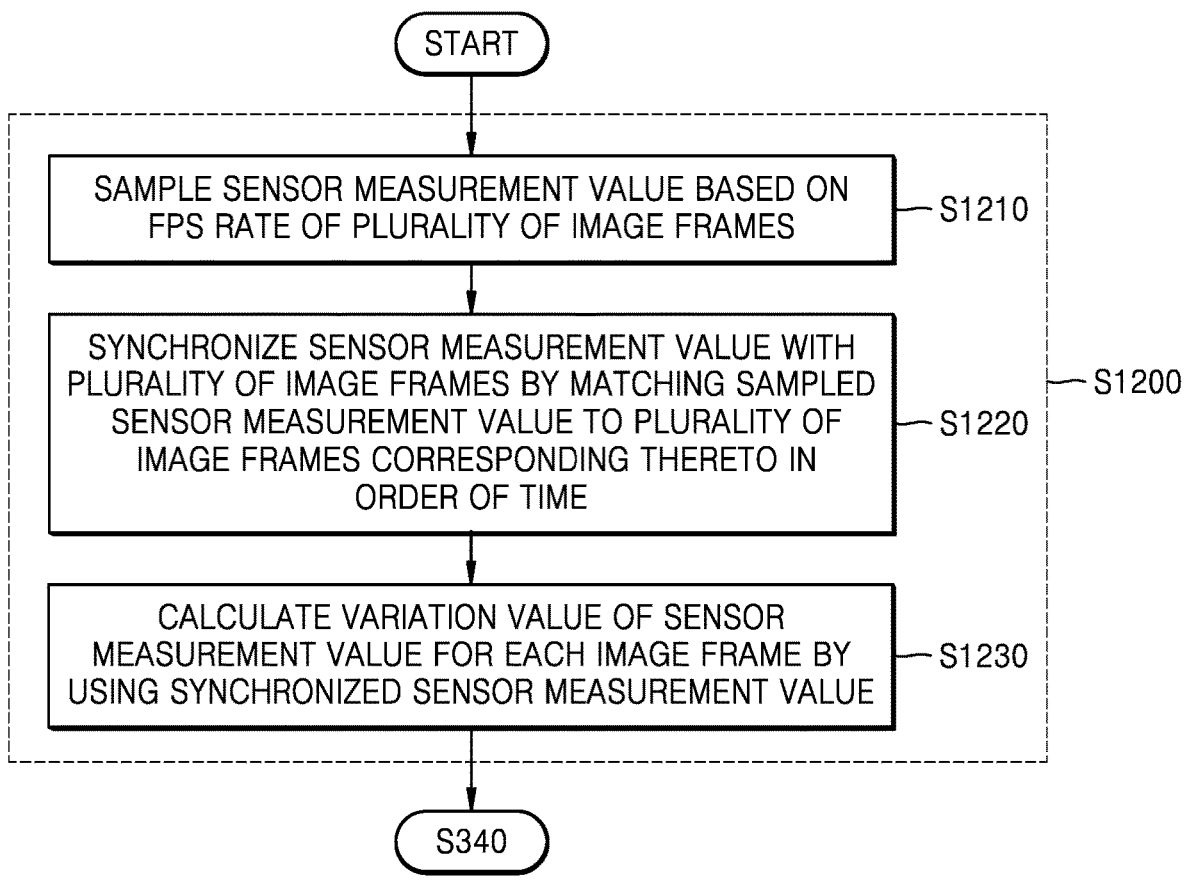
FIG. 12 is a flowchart illustrating a method by which an AR device synchronizes a measurement value of an IMU sensor obtained from a wearable device with an image frame and obtains a variation value of a sensor measurement value for each image frame, according to an embodiment of the disclosure.

FIG. 12 is a flowchart illustrating a method by which the AR device 1000 synchronizes a measurement value of an IMU sensor obtained from a wearable device with an image frame and obtains a variation value of a sensor measurement value for each image frame, according to an embodiment of the disclosure.

Figure 13:
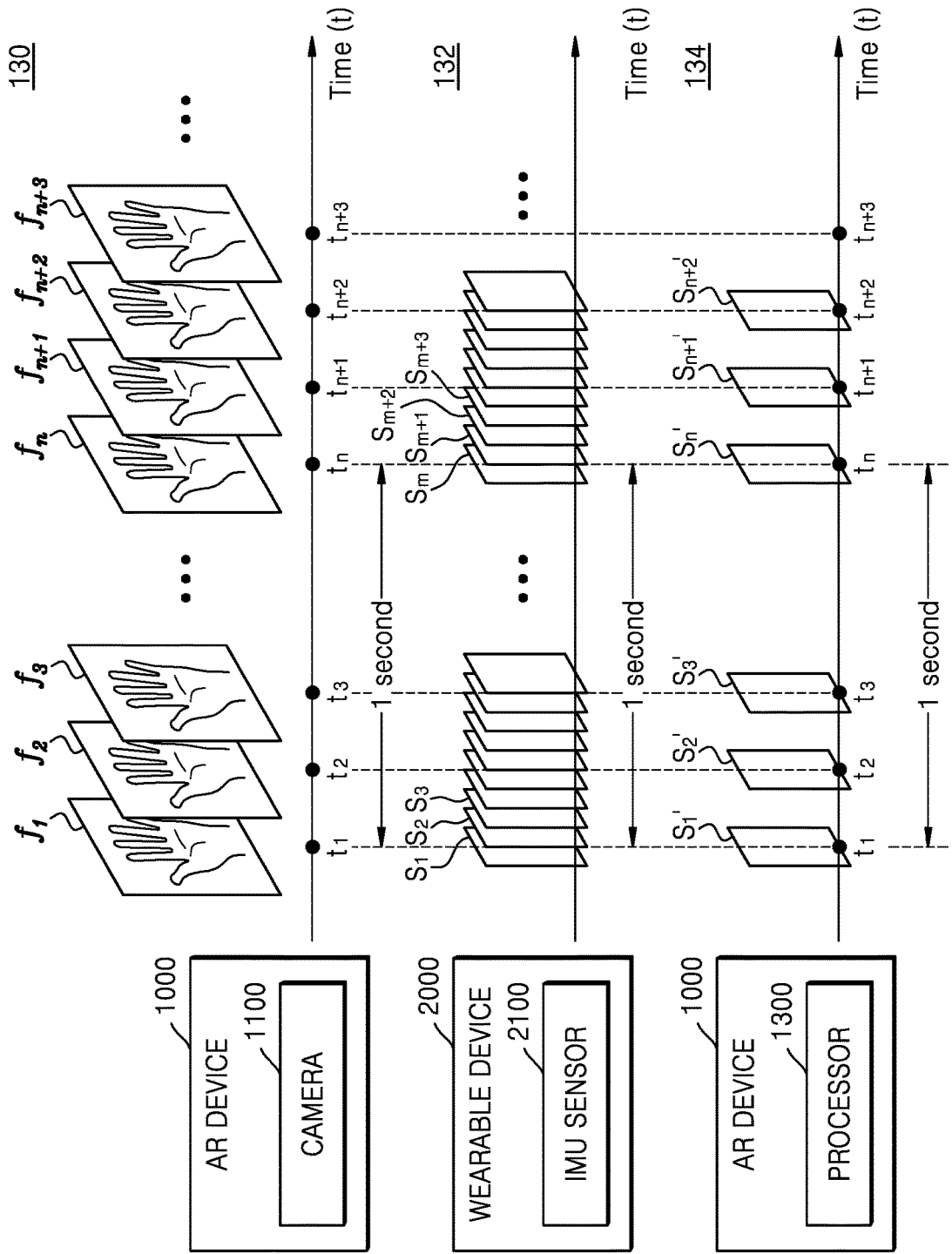
FIG. 13 is a diagram for describing an operation in which an AR device synchronizes a measurement value of an IMU sensor obtained from a wearable device with image frames, based on a frame per second (FPS) rate of the image frames, according to an embodiment of the disclosure.

FIG. 13 is a diagram for describing an operation in which the AR device 1000 synchronizes a measurement value of an IMU sensor obtained from the wearable device 2000 with image frames, based on an FPS rate of the image frames, according to an embodiment of the disclosure.

Referring to FIG. 12, in operation S1200, the AR device 1000 may obtain a variation value of the sensor measurement value for each image frame. Operation S1200 illustrated in FIG. 12 may be performed after operation S320 illustrated in FIG. 3 is performed. However, the disclosure is not limited thereto, and operation S1200 may be performed after operation S330 illustrated in FIG. 3 is performed. After operation S1200 of FIG. 12 is performed, operation S340 of FIG. 3 may be performed.

Operation S1200 may include operations S1210 to S1230.

In operation S1210, the AR device 1000 may sample the sensor measurement value based on the FPS rate of the plurality of image frames. Referring to FIG. 12 and FIG. 13 together, the camera 1100 of the AR device 1000 may obtain n image frames per second. Referring to a first graph 130 about a time-image frame illustrated in FIG. 13, the camera 1100 may obtain n image frames including a first image frame $f_1$ to an n-th image frame $f_n$ per second. For example, when the FPS rate of the camera 1100 is 30, the value of n may be 30, and when the number of frames per second is 60, the value of n may be 60.

The wearable device 2000 may obtain m 6 DoF data sets per second by using the IMU sensor 2100. Referring to a second graph 132 about a time-sensor measurement value illustrated in FIG. 13, the IMU sensor 2100 may obtain m image frames including first measurement value data S1 to m-th measurement value data Sm per second. For example, the value of m may be 500 but is not limited thereto. In the second graph 132, the first measurement value data S1 may include a 6 DoF data set about the joint of the hand at the first time point $t_1$. In an embodiment of the disclosure, the first measurement value data S1 may include the three-dimensional position coordinate values (x-axis, y-axis, and z-axis coordinate values) and the three-axis angular velocity values (roll, yaw, and pitch) at the first time point $t_1$. Likewise, the second measurement value data S2 may include a 6 DoF data set about the joint of the hand at the second time point $t_2$.

The wearable device 2000 may transmit m measurement value data S1 to Sm per second to the AR device 1000.

The processor 1300 of the AR device 1000 may sample the measurement value data $S_1$ to $S_m$ obtained from the wearable device 2000 according to the FPS rate of the plurality of image frames $f_1$ to $f_n$. For example, when the FPS rate of the plurality of image frames $f_1$ to $f_n$ is 30 and the number of measurement value data $S_1$ to $S_m$ obtained per second is 500, the processor 1300 may sample only 30 pieces of measurement value data $S_1'$ to $S_n'$ among 500 pieces of measurement value data $S_1$ to $S_m$. Referring to a third graph 134 of time-sampled measurement value data illustrated in FIG. 13, the processor 1300 may selectively sample only n pieces of measurement value data $S_1'$ to $S_n'$ among m pieces of measurement value data $S_1$ to $S_m$.

In operation S1220 of FIG. 12, the AR device 1000 may synchronize the sensor measurement values with the plurality of image frames by matching the sampled sensor measurement value to the plurality of image frames corresponding thereto in order of time. Referring to FIG. 12 and FIG. 13 together, the processor 1300 of the AR device 1000 may match the sampled sensor measurement value data $S_1'$ to $S_n'$ to the plurality of image frames $f_1$ to $f_n$ corresponding thereto in order of time. Referring to the first graph 130 and the third graph 134 of FIG. 13, the processor 1300 may match the first image frame $f_1$ at the first time point $t_1$ to the sampled first measurement value data $S_1'$ and may match the second image frame $f_2$ at the second time point $t_2$ to the sampled second measurement value data $S_2'$. Likewise, the processor 1300 may match the n-th image frame $f_n$ to the sampled n-th measurement value data $S_n'$. The processor 1300 may synchronize the plurality of image frames $f_1$ to $f_n$ with the sensor measurement value data $S_1'$ to $S_n'$ by matching the plurality of image frames $f_1$ to $f_n$ to the sampled sensor measurement value data $S_1$ to $S_n'$.

In operation S1230 of FIG. 12, the AR device 1000 may calculate a variation value of the sensor measurement value for each image frame by using the synchronized sensor measurement value. Referring to the third graph 134 of FIG. 13, the processor 1300 of the AR device 1000 may obtain information about the variation value of the measurement value about the second image frame $f_2$ by calculating the difference value between the sampled second measurement value data $S_2$ at the second time point $t_2$ and the sampled first measurement value data $S_1$ at the first time point $t_1$. When the processor 1300 corrects the three-dimensional position coordinate value of the joint of the hand obtained from the second image frame $f_2$, the processor 1300 may correct the three-dimensional position coordinate value by using variation value information about the difference value between the first measurement value data $S_1$ and the second measurement value data $S_2$ calculated at the second time point $t_2$.

Figure 14:
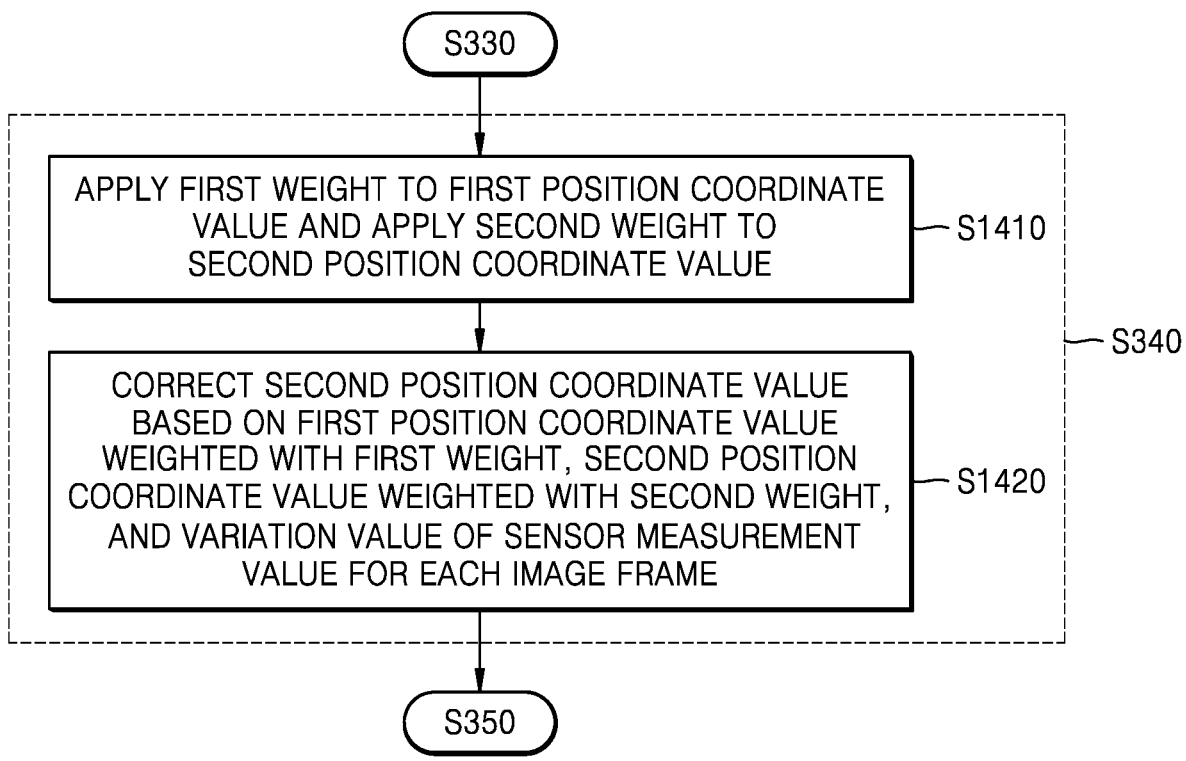
FIG. 14 is a flowchart illustrating a method by which an AR device corrects a three-dimensional position coordinate value of a joint of a hand, according to an embodiment of the disclosure.

FIG. 14 is a flowchart illustrating a method by which the AR device 1000 corrects a three-dimensional position coordinate value of a joint of a hand, according to an embodiment of the disclosure.

Operations S1410 and S1420 illustrated in FIG. 14 may be detailed operations of operation S340 illustrated in FIG. 3. Operation S1410 of FIG. 14 may be performed after operation S330 illustrated in FIG. 3 is performed. Operation S350 illustrated in FIG. 3 may be performed after operation S1420 of FIG. 14 is performed.

In operation S1410, the AR device 1000 may apply a first weight to the first position coordinate value and apply a second weight to the second position coordinate value. Each of the first weight and the second weight may be a value that is greater than or equal to 0 and is less than or equal to 1. In an embodiment of the disclosure, the first weight and the second weight may be determined based on at least one of whether the hand is detected in each of the first image frame and the second image frame, the difference value between the first position coordinate value and the second position coordinate value, or whether the position of the hand moves between the inside and the outside of the FOV area of the camera 1100 (see FIGS. 1A and 2).

In an embodiment of the disclosure, when the hand is not detected in any one of the first image frame and the second image frame, the processor 1300 (see FIG. 2) of the AR device 1000 may determine the weight for the undetected image frame as 0 or a value close to 0. For example, when the hand is not detected in the first image frame and the hand is detected in the second image frame, the processor 1300 may determine the first weight for the first image frame as 0 or a small value close to 0 and may determine the second weight as 1 or a value close to 1. In this case, the processor 1300 may correct the three-dimensional position coordinate value of the joint of the hand to be corrected, with respect to the three-dimensional position coordinate value obtained from the second image frame. As an example, when the hand is detected in the first image frame and the hand is not detected in the second image frame, the processor 1300 may determine the first weight for the first image frame as 1 or a value close to 1 and may determine the second weight for the second image frame as 0 or a value close to 0. In this case, the processor 1300 may correct the three-dimensional position coordinate value of the joint of the hand in the second image frame to be corrected, with respect to the three-dimensional position coordinate value obtained from the first image frame.

In an embodiment of the disclosure, the AR device 1000 may determine the first weight and the second weight according to whether the position of the user's hand is located inside or outside the FOV area of the camera 1100. For example, when the position of the hand is located outside the FOV area of the camera 1100 in the first image frame and then the position of the hand moves to the inside of the FOV area of the camera 1100 in the second image frame, the processor 1300 may determine the first weight for the first image frame as 0 or a small value close to 0 and may determine the second weight as 1 or a value close to 1. In this case, the processor 1300 may correct the three-dimensional position coordinate value of the joint of the hand to be corrected, with respect to the three-dimensional position coordinate value obtained from the second image frame.

In operation S1420, the AR device 1000 may correct the second position coordinate value based on the first position coordinate value weighted with the first weight, the second position coordinate value weighted with the second weight, and the variation value of the sensor measurement value for each image frame. In an embodiment of the disclosure, the processor 1300 of the AR device 1000 may apply the second weight to the second position coordinate value at the current time point $t_0$, which is determined as requiring correction, and may apply the first weight to the first position coordinate value obtained from the first image frame at the previous time point $t_{-1}$. The processor 1300 may correct the second position coordinate value based on the first position coordinate value weighted with the first weight, the second position coordinate value weighted with the second weight, and the sensor measurement value for each image frame of the IMU sensor 2100 obtained from the wearable device 2000 (see FIG. 13)

Figure 15:
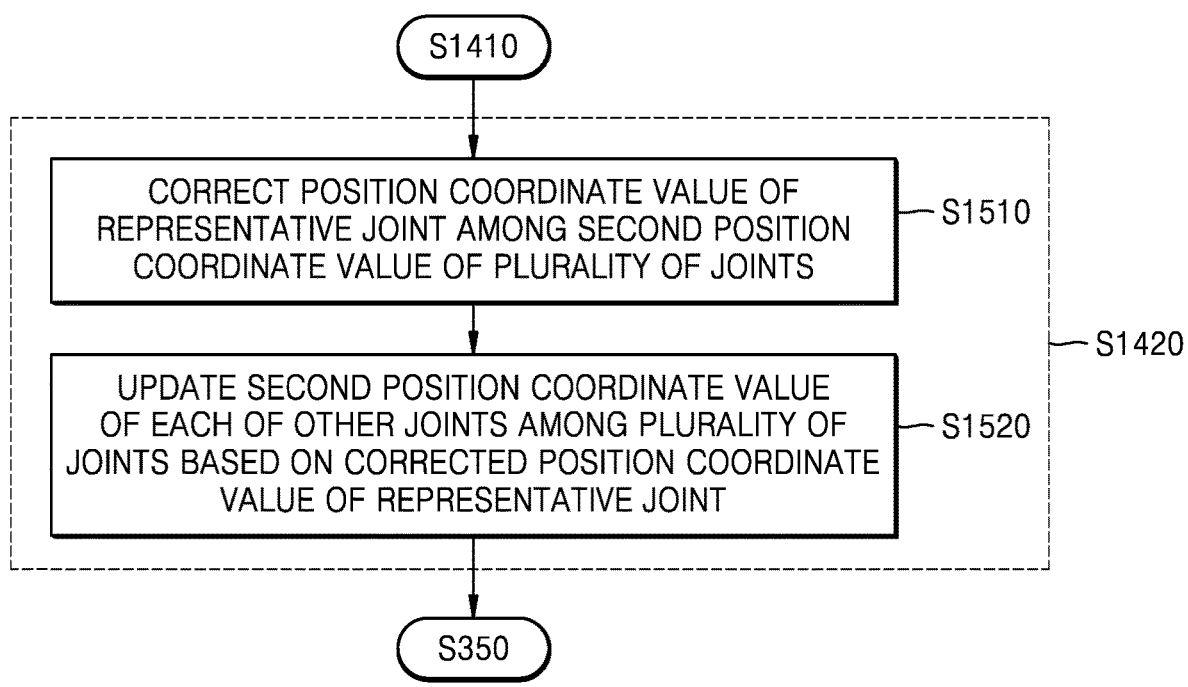
FIG. 15 is a flowchart illustrating a method by which an AR device updates a three-dimensional position coordinate value of a joint of a hand, according to an embodiment of the disclosure.

FIG. 15 is a flowchart illustrating a method by which the AR device 1000 updates a three-dimensional position coordinate value of a joint of a hand, according to an embodiment of the disclosure.

Operations S1510 and S1520 illustrated in FIG. 15 may be detailed operations of operation S1420 illustrated in FIG. 14. Operation S350 illustrated in FIG. 3 may be performed after operation S1520 of FIG. 15 is performed.

In operation S1510, the AR device 1000 may correct the position coordinate value of a representative joint among the second position coordinate values of the plurality of joints. The representative joint may be determined as any joint among the plurality of joints included in the hand. The "position coordinate value of the representative joint" may be the position coordinates of any joint among the plurality of joints included in the hand and may be, for example, $P_0$ (see FIG. 6) that is the position coordinates of the joint adjacent to the wrist. However, the disclosure is not limited thereto, and the representative joint may be the index fingertip. For example, when the index fingertip is the fingertip of the index finger, the position coordinate value of the representative joint may be $P_8$ (see FIG. 6).

The processor 1300 (see FIG. 2) of the AR device 1000 may correct the position coordinate value of the representative joint among the second position coordinate values of the plurality of joints included in the hand.

In operation S1520, the AR device 1000 may update the second position coordinate value of each of the other joints among the plurality of joints based on the corrected position coordinate value of the representative joint. In an embodiment of the disclosure, the processor 1300 of the AR device 1000 may update the three-dimensional position coordinate value of the other joints with respect to the corrected three-dimensional position coordinate value of the representative joint based on the position relationship between the representative joint and the other joints. The processor 1300 may update the three-dimensional position coordinate values of the plurality of joints by correcting the three-dimensional position coordinate value of the representative joint and the three-dimensional position coordinate values of the other joints.

A program executed by the AR device 1000 described herein may be implemented as a hardware component, a software component, and/or a combination of a hardware component and a software component. The program may be performed by any system capable of executing computer-readable instructions.

The software may include computer programs, code, instructions, or a combination of one or more thereof and may configure the processor to operate as desired or may instruct the processor independently or collectively.

The software may be implemented as a computer program including instructions stored in a computer-readable storage medium. The computer-readable recording medium may include, for example, a magnetic storage medium (e.g., read-only memory (ROM), random-access memory (RAM), floppy disk, or hard disk) and an optical readable medium (e.g., CD-ROM or digital versatile disc (DVD)). The computer-readable recording medium may be distributed in network-connected computer systems such that computer-readable codes may be stored and executed in a distributed manner. The medium may be readable by a computer, stored in a memory, and executed in a processor.

The computer-readable storage mediums may be provided in the form of non-transitory storage mediums. Here, "non-transitory" may merely mean that the storage mediums do not include signals and are tangible, but does not distinguish semi-permanent or temporary storage of data in the storage mediums. For example, the "non-transitory storage medium" may include a buffer in which data is temporarily stored.

Also, the program according to the embodiments of the disclosure may be included and provided in a computer program product. The computer program product may be traded as a product between a seller and a buyer.

The computer program product may include a software program and a computer-readable storage medium with a software program stored therein. For example, the computer program product may include a product (e.g., a downloadable application) in the form of a software program electronically distributed through a manufacturer of the AR device 1000 or an electronic market (e.g., Samsung Galaxy Store). For electronic distribution, at least a portion of the software program may be stored in a storage medium or may be temporarily generated. In this case, the storage medium may be a storage medium of a server of the manufacturer of the AR device 1000, a server of the electronic market, or a relay server for temporarily storing the software program.

The computer program product may include a storage medium of the server or a storage medium of the AR device 1000 in a system including the AR device 1000, the wearable device 2000, and/or the server. Alternatively, when there is a third device (e.g., a mobile device) communicatively connected to the AR device 1000, the computer program product may include a storage medium of the third device. Alternatively, the computer program product may include the software program itself that is transmitted from the AR device 1000 to the electronic device or the third device or transmitted from the third device to the electronic device.

In this case, one of the AR device 1000, the wearable device 2000, and the third device may execute the computer program product to perform the method according to the embodiments of the disclosure. Alternatively, two or more of the AR device 1000, the wearable device 2000, and the third device may execute the computer program product to perform the method according to the embodiments of the disclosure in a distributed manner.

For example, the AR device 1000 may execute the computer program product stored in the memory 1400 (see FIG. 2) such that an electronic device (e.g., a mobile device) communicatively connected to the AR device 1000 may be controlled to perform the method according to the embodiments of the disclosure.

As an example, the third device may execute the computer program product to control the electronic device communicatively connected to the third device to perform the method according to the embodiments of the disclosure.

When the third device executes the computer program product, the third device may download the computer program product from the AR device 1000 and execute the downloaded computer program product. Alternatively, the third device may perform the method according to the embodiments of the disclosure by executing the computer program product provided in a preloaded state.

While certain embodiments of the disclosure have been described above with reference to the drawings, those of ordinary skill in the art may make various changes and modifications therein from the above description. For example, suitable results may be achieved even when the described technologies are performed in a different order from the described method and/or the components of the described computer system or module are coupled or combined in a different form from the described method or are replaced or substituted by other components or equivalents.

The invention claimed is:

1. An augmented reality (AR) device for obtaining position information about a plurality of joints included in a hand of a user, the AR device comprising:
   a communication interface configured to perform data communication with an external device;
   a camera configured to obtain a plurality of image frames including the hand by photographing the hand;
   a memory storing at least one instruction; and
   at least one processor configured to execute the at least one instruction to
   detect the hand from the plurality of image frames and obtain three-dimensional position coordinate values of a plurality of joints included in the detected hand,
   obtain, through the communication interface, a sensor measurement value for at least one joint among the plurality of joints measured by an inertial measurement unit (IMU) sensor of the external device, determine, based on a result of the detecting of the hand, whether it is necessary to correct a three-dimensional position coordinate value of at least one joint obtained from a first image frame among the plurality of image frames, and update a second position coordinate value by correcting the second position coordinate value according to a result of the determining based on at least one of a first position coordinate value of the plurality of joints obtained from a second image frame previous to a first image frame among the plurality of image frames, the second position coordinate value of the plurality of joints obtained from the first image frame, or a variation value of the sensor measurement value for each image frame.

2. The AR device of claim 1, wherein the external device is a wearable device worn on at least one region among a wrist, a finger, or a palm of the user and includes the IMU sensor configured to obtain a measurement value of 6 degrees of freedom (6 DoF) for at least one joint among the plurality of joints.

3. The AR device of claim 1, wherein the at least one processor is configured to determine whether it is necessary to correct at least one three-dimensional position coordinate value obtained from the first image frame, based on whether the hand is not detected from the first image frame or whether the three-dimensional position coordinate value of the at least one joint is not obtained.

4. The AR device of claim 1, wherein the at least one processor is configured to calculate a difference value between the first position coordinate value and the second position coordinate value and compare the calculated difference value with a preset threshold, and determine, based on a result of the comparing, whether it is necessary to correct the three-dimensional position coordinate value of the at least one joint.

5. The AR device of claim 1, wherein the at least one processor is configured to determine whether it is necessary to correct the three-dimensional position coordinate value of the at least one joint, based on whether a position of the hand is moved between inside and outside of a field of view (FOV) area of the camera.

6. The AR device of claim 5, wherein the at least one processor is configured to determine whether it is necessary to correct the three-dimensional position coordinate value of the at least one joint, based on a difference value between the first position coordinate value obtained when the position of the hand is located outside the FOV area of the camera and the second position coordinate value obtained from the first image frame obtained inside the FOV area.

7. The AR device of claim 1, wherein the at least one processor is configured to sample the obtained sensor measurement value based on a frame per second (FPS) rate of the plurality of image frames, synchronize the sensor measurement value with the plurality of image frames by matching the sampled sensor measurement value to the plurality of image frames corresponding thereto in order of time, and calculate the variation value of the sensor measurement value for each image frame by using the synchronized sensor measurement value.

8. The AR device of claim 7, wherein the at least one processor is configured to apply a first weight to the first position coordinate value and apply a second weight to the second position coordinate value, and correct the second position coordinate value based on the first position coordinate value weighted with the first weight, the second position coordinate value weighted with the second weight, and the variation value of the sensor measurement value for each image frame.

9. A method, performed by an augmented reality (AR) device, of obtaining position information about a plurality of joints included in a hand of a user, the method comprising:

detecting the hand of the user from a plurality of image frames and obtaining three-dimensional position coordinate values of a plurality of joints included in the detected hand;

obtaining a sensor measurement value for at least one joint among the plurality of joints measured by using an inertial measurement unit (IMU) sensor of an external device;

determining, based on a result of the detecting of the hand, whether it is necessary to correct a three-dimensional position coordinate value of at least one joint obtained from a first image frame among the plurality of image frames;

updating a second position coordinate value by correcting the second position coordinate value according to a result of the determining based on at least one of a first position coordinate value of the plurality of joints obtained from a second image frame previous to a first image frame among the plurality of image frames, the second position coordinate value of the plurality of joints obtained from the first image frame, or a variation value of the sensor measurement value for each image frame; and outputting the updated second position coordinate value.

10. The method of claim 9, wherein the determining of whether it is necessary to correct the three-dimensional position coordinate value of the at least one joint comprises determining whether it is necessary to correct at least one three-dimensional position coordinate value obtained from the first image frame, based on whether the hand is not detected from the first image frame or whether the three-dimensional position coordinate value of the at least one joint is not obtained.

11. The method of claim 9, wherein the determining of whether it is necessary to correct the three-dimensional position coordinate value of the at least one joint comprises:

calculating a difference value between the first position coordinate value obtained from the second image frame and the second position coordinate value obtained from the first image frame;

comparing the calculated difference value with a preset threshold; and determining, based on a result of the comparing, whether it is necessary to correct the three-dimensional position coordinate value of the at least one joint.

12. The method of claim 9, wherein the determining of whether it is necessary to correct the three-dimensional position coordinate value of the at least one joint comprises determining whether it is necessary to correct the three-dimensional position coordinate value of the at least one joint, based on whether a position of the hand is moved between inside and outside of a field of view (FOV) area of the camera.

13. The method of claim 12, wherein the determining of whether it is necessary to correct the three-dimensional position coordinate value of the at least one joint comprises determining whether it is necessary to correct the three-dimensional position coordinate value of the at least one joint, based on a difference value between the first position coordinate value obtained when the position of the hand is located outside the FOV area of the camera and the second position coordinate value obtained from the first image frame obtained inside the FOV area.

14. The method of claim 9, further comprising obtaining the variation value of the sensor measurement value for each image frame, wherein the obtaining of the variation value of the sensor measurement value for each image frame comprises:
   sampling the obtained sensor measurement value based on a frame per second (FPS) rate of the plurality of image frames;
   synchronizing the sensor measurement value with the plurality of image frames by matching the sampled sensor measurement value to the plurality of image frames corresponding thereto in order of time; and
   calculating the variation value of the sensor measurement value for each image frame by using the synchronized sensor measurement value.

15. A computer program product comprising a non-transitory computer-readable storage medium, the computer-readable storage medium comprising instructions readable by an augmented reality (AR) device to allow the AR device to perform:
   detecting a hand of a user from a plurality of image frames and obtaining three-dimensional position coordinate values of a plurality of joints included in the detected hand;
   obtaining a sensor measurement value for at least one joint among the plurality of joints measured by an inertial measurement unit (IMU) sensor of an external device;
   determining, based on a result of the detecting of the hand, whether it is necessary to correct a three-dimensional position coordinate value of at least one joint obtained from a first image frame among the plurality of image frames;
   updating a second position coordinate value by correcting the second position coordinate value according to a result of the determining based on at least one of a first position coordinate value of the plurality of joints obtained from a second image frame previous to a first image frame among the plurality of image frames, the second position coordinate value of the plurality of joints obtained from the first image frame, or a variation value of the sensor measurement value for each image frame; and
   outputting the updated second position coordinate value.

* * * * *